(12) United States Patent
Amao

(10) Patent No.: US 9,169,412 B2
(45) Date of Patent: Oct. 27, 2015

(54) CURABLE COMPOSITION AND IMAGE FORMING METHOD

(71) Applicant: FUJIFILM CORPORATION, Tokyo (JP)

(72) Inventor: Akihito Amao, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/608,472

(22) Filed: Jan. 29, 2015

(65) Prior Publication Data

US 2015/0210876 A1    Jul. 30, 2015

Related U.S. Application Data

(63) Continuation of application No. PCT/JP2013/071816, filed on Aug. 12, 2013.

(30) Foreign Application Priority Data

Sep. 14, 2012   (JP) .................................. 2012-203303
Jul. 26, 2013    (JP) .................................. 2013-155716

(51) Int. Cl.
*B41J 2/17*     (2006.01)
*C09D 11/30*   (2014.01)
*C09D 11/101*  (2014.01)
*B41J 2/21*     (2006.01)

(52) U.S. Cl.
CPC ............... *C09D 11/30* (2013.01); *B41J 2/2107* (2013.01); *C09D 11/101* (2013.01)

(58) Field of Classification Search
CPC ...... C09D 11/30; C09D 11/00; C09D 11/101; B41J 2/2107; B41J 11/0015
USPC ........... 347/95, 96, 100, 102; 430/320; 522/6, 522/84
See application file for complete search history.

(56) References Cited

U.S. PATENT DOCUMENTS 7,084,187 B2 *   8/2006   Takase et al. .................. 522/153
8,905,534 B2 * 12/2014   Amao et al. ................... 347/100
8,998,399 B2 *   4/2015   Kitade et al. .................. 347/100

FOREIGN PATENT DOCUMENTS

JP   2005-307198 A   11/2005
JP   2007-031372 A    2/2007

OTHER PUBLICATIONS

International Search Report; PCT/JP2013/071816; Sep. 10, 2013.

*Primary Examiner* — An Do
(74) *Attorney, Agent, or Firm* — Studebaker & Brackett PC

(57) ABSTRACT

A curable composition includes a polyfunctional polymerizable compound A1 represented by the following general formula (1) and a polyfunctional compound A2 which differs from A1.

General Formula (I)

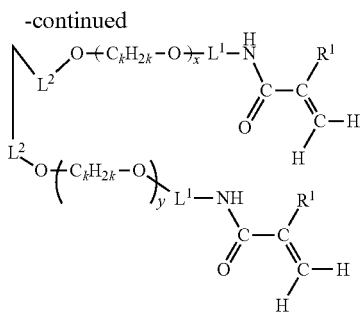

(In the formula, $R^1$ represents a hydrogen atom or a methyl group. $L^1$ represents a linear or branched alkylene group having 2 to 4 carbon atoms. However, $L^1$ does not have a structure in which the oxygen atom and the nitrogen atom bonded on both ends of $L^1$ are bonded to the same carbon atom of $L^1$. $L^2$ represents a divalent linking group. k represents 2 or 3. x, y, and z each independently represent integers of 0 to 6, and x+y+z equals 0 to 18.)

19 Claims, 2 Drawing Sheets

CURABLE COMPOSITION AND IMAGE FORMING METHOD

CROSS-REFERENCE TO RELATED APPLICATIONS

This application is a Continuation of PCT International Application No. PCT/JP2013/71816, filed on Aug. 12, 2013, which claims priority under 35 U.S.C. §119(a) to Japanese Patent Application No. 2012-203303, filed on Sep. 14, 2012, and to Japanese Patent Application No. 2013-155716, filed on Jul. 26, 2013. Each of the above application(s) is hereby expressly incorporated by reference, in its entirety, into the present application.

BACKGROUND OF THE INVENTION

1. Field of the Invention

The present invention relates to a curable composition and an image forming method using the same.

2. Description of the Related Art

A compound which is cured by crosslinking a binder or the like by applying energy such as light and heat is widely used in industrial applications of coating materials, paints, printing inks, adhesives, optical materials, laminate materials in electronic devices, electrically insulating materials, resist materials, or the like, as a raw material for various polymers or curable compositions. For example, the weather resistance or durability of an image is increased by blending a curable compound which is cured by irradiation with actinic energy rays such as ultraviolet rays as a curing agent or a crosslinking agent into an ink or paint, and irradiating the blend with ultraviolet rays or the like after image formation to polymerize crosslinkable compounds, thereby forming a cured film.

Various polyfunctional polymerizable compounds have been studied as the curable compound.

Examples of a functional group of the polyfunctional polymerizable compound include groups containing ethylenically unsaturated groups, such as a (meth)acryloyl group, a vinyl group, and a maleimide group, an epoxy group, an oxetane ring group, an isocyanate group, a hydroxyl group, and a carboxyl group. Among these, an ethylenically unsaturated group has high stability and easily undergoes polymerization by light irradiation or heating in the presence of a polymerization initiator, and therefore, a polyfunctional polymerizable compound having an ethylenically unsaturated group has a wide range of applications.

As a compound having a (meth)acryloyl group, polyfunctional (meth)acryloylamide compounds have also been actively studied, in addition to polyfunctional (meth)acrylates. Regarding polyfunctional (meth)acryloylamide compounds, applications in, for example, actinic energy ray-irradiated aqueous inks (see JP2005-307198A) or conductive polymer paints (see JP2007-31372A) have been studied.

SUMMARY OF THE INVENTION

An object of the present invention is to provide a curable composition having excellent storage stability and curability, and an image forming method using the same.

The present inventors have conducted various studies on polyfunctional (meth)acrylamide compounds having various structures, and as a result, they have found a polyfunctional (meth)acrylamide compound having a specific structure and have conducted more studies thereon, thereby completing the present invention.

That is, the above-described problems of the present invention have been solved by using a curable composition and an image forming method using the same, as described below.

(1) A curable composition including a polyfunctional polymerizable compound A1 represented by the following general formula (1) and a polyfunctional polymerizable compound A2 which differs from A1.

[Chem. 1]

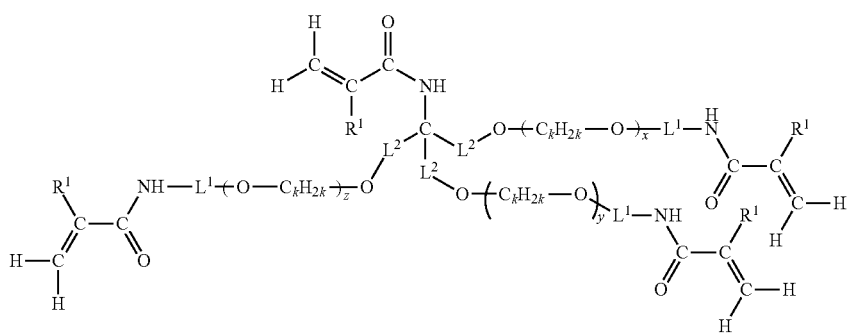

General Formula (1)

In the general formula (1), $R^1$ represents a hydrogen atom or a methyl group. $L^1$ represents a linear or branched alkylene group having 2 to 4 carbon atoms. However, $L^1$ does not have a structure in which the oxygen atom and the nitrogen atom bonded on both ends of $L^1$ are bonded to the same carbon atom of $L^1$. $L^2$ represents a divalent linking group. k represents 2 or 3. x, y, and z each independently represent integers of 0 to 6, and x+y+z equals 0 to 18.

(2) The curable composition as described in (1), in which the polyfunctional polymerizable compound A2 is a monomer having at least two ethylenically unsaturated groups.

(3) The curable composition as described in (1) or (2), in which the polyfunctional polymerizable compound A2 is a monomer having at least two groups selected from a (meth)acryloyl group and a vinyl group.

(4) The curable composition as described in any one of (1) to (3), in which the polyfunctional polymerizable compound A2 is a compound represented by the following general formula (M1), (M2), or (M3).

[Chem. 2]

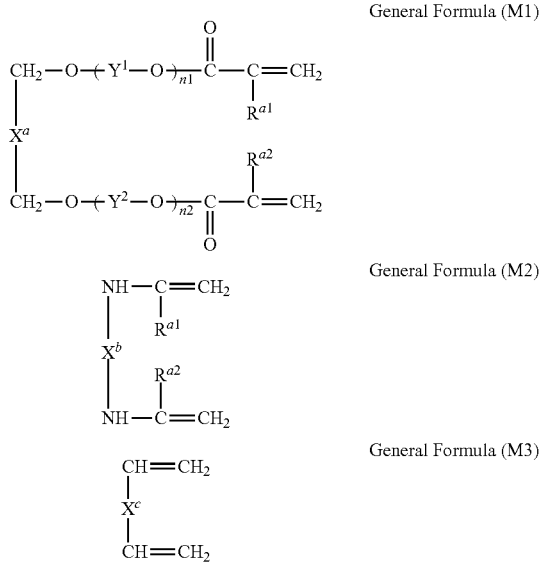

General Formula (M1)

General Formula (M2)

General Formula (M3)

In the general formulae (M1) to (M3), $R^{a1}$ and $R^{a2}$ each independently represent a hydrogen atom or a methyl group, $Y^1$ and $Y^2$ each independently represent an alkylene group, n1 and n2 each independently represent 0 or a number of 1 or more, and $X^a$, $X^b$, and $X^c$ each represent a divalent linking group.

(5) The curable composition as described in (4), in which $X^a$ and $X^b$ are each an alkylene group or an alkylene group interrupted by an oxygen atom, $Y^1$ and $Y^2$ are each an ethylene group or a propylene group, and $X^c$ is an alkylene group or a phenylene group.

(6) The curable composition as described in any one of (1) to (5), in which the ratio of the content of the polyfunctional polymerizable compound A1 to the content of the polyfunctional polymerizable compound A2 in the curable composition satisfies a content of A1:a content of A2=99:1 to 5:95 on the basis of mass.

(7) The curable composition as described in any one of (1) to (6), further including a monofunctional polymerizable compound C.

(8) The curable composition as described in (7), in which the monofunctional polymerizable compound C is a monofunctional polymerizable compound having a (meth)acrylamide structure.

(9) The curable composition as described in (7) or (8), in which the monofunctional polymerizable compound C is a compound represented by the following general formula (MA).

[Chem. 3]

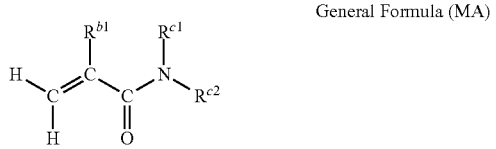

General Formula (MA)

In the general formula (MA), $R^{b1}$ represents a hydrogen atom or a methyl group, $R^{c1}$ represents a hydrogen atom, a methyl group, or an ethyl group, and $R^{c2}$ represents an alkyl group. Here, $R^{c1}$ and $R^{c2}$ may be bonded to each other to form a 5- to 8-membered ring.

(10) The curable composition as described in any one of (7) to (9), in which the ratio of the content of all the polyfunctional polymerizable compounds A including the polyfunctional polymerizable compound A1 and the polyfunctional polymerizable compound A2 to the content of the monofunctional polymerizable compound C in the curable composition satisfies a content of A:a content of C=1:99 to 90:10 on the basis of mass.

(11) The curable composition as described in any one of (1) to (10), in which the content of all the polyfunctional polymerizable compounds A in the curable composition is from 0.1% by mass to 20% by mass.

(12) The curable composition as described in any one of (7) to (11), in which the content of the monofunctional polymerizable compound C in the curable composition is from 2% by mass to 35% by mass.

(13) The curable composition as described in any one of (1) to (12), further including a solvent.

(14) The curable composition as described in (13), in which water is contained in the solvent.

(15) The curable composition as described in any one of (1) to (14), in which the curable composition is a composition for an ink.

(16) The curable composition as described in (15), further including a coloring material.

(17) The curable composition as described in (15) or (16), which is used for ink jet recording.

(18) An image forming method including a step of adding the curable composition as described in any one of (1) to (17) on a recording medium and a step of irradiating the added curable composition with actinic energy rays.

(19) The image forming method as described in (18), in which the curable composition is added onto the recording medium in an ink jet mode.

In the present specification, "(meth)acryloyl" means either or both of acryloyl (—C(=O)CH=CH$_2$) and methacryloyl (—C(=O)C(CH$_3$)=CH$_2$). This shall apply to the terms "(meth)acryl", "(meth)acrylate", and "(meth)acrylamide".

In the present specification, "to" is used for the meaning which includes the numerical values which are written before and after thereof as the lower limit value and the upper limit value.

Furthermore, unless otherwise specified, when there are a plurality of substituents, linking groups, or the like (hereinafter referred to as a substituent or the like) indicated by specific symbols or in the case where a plurality of substituents are defined alternatively or simultaneously, the substituents may be the same as or different from each other. This also applies to the provisions for the number of substituents. Further, in the case where there is a repetition of a plurality of partial structures represented by the same indications in the formula, the partial structures or repeating units may be the same as or different from each other.

In addition, geometric isomers, which are substitution patterns of the double bonds in the respective formulae, may be E isomers or Z isomers, or a mixture thereof even when there are descriptions of only one kind of isomers for display purposes unless otherwise mentioned.

In the present specification, the "curable composition" means a composition containing a polymerizable compound having two or more polymerizable groups, which is cured by a polymerization reaction of the polymerizable compound under a certain condition to form a crosslinked structure.

The curable composition of the present invention has excellent storage stability and curing performance.

Furthermore, the polyfunctional polymerizable compound used in the curable composition of the present invention has excellent solubility in various solvents, and in the case where the curable composition of the present invention is used as an ink composition, it is rapidly cured by irradiation with actinic energy rays or the like during the printing. Accordingly, by using the curable composition of the present invention as an ink composition, an image having fastness can be rapidly formed.

DESCRIPTION OF THE PREFERRED EMBODIMENTS

<<Curable Composition>>

Figure 1:
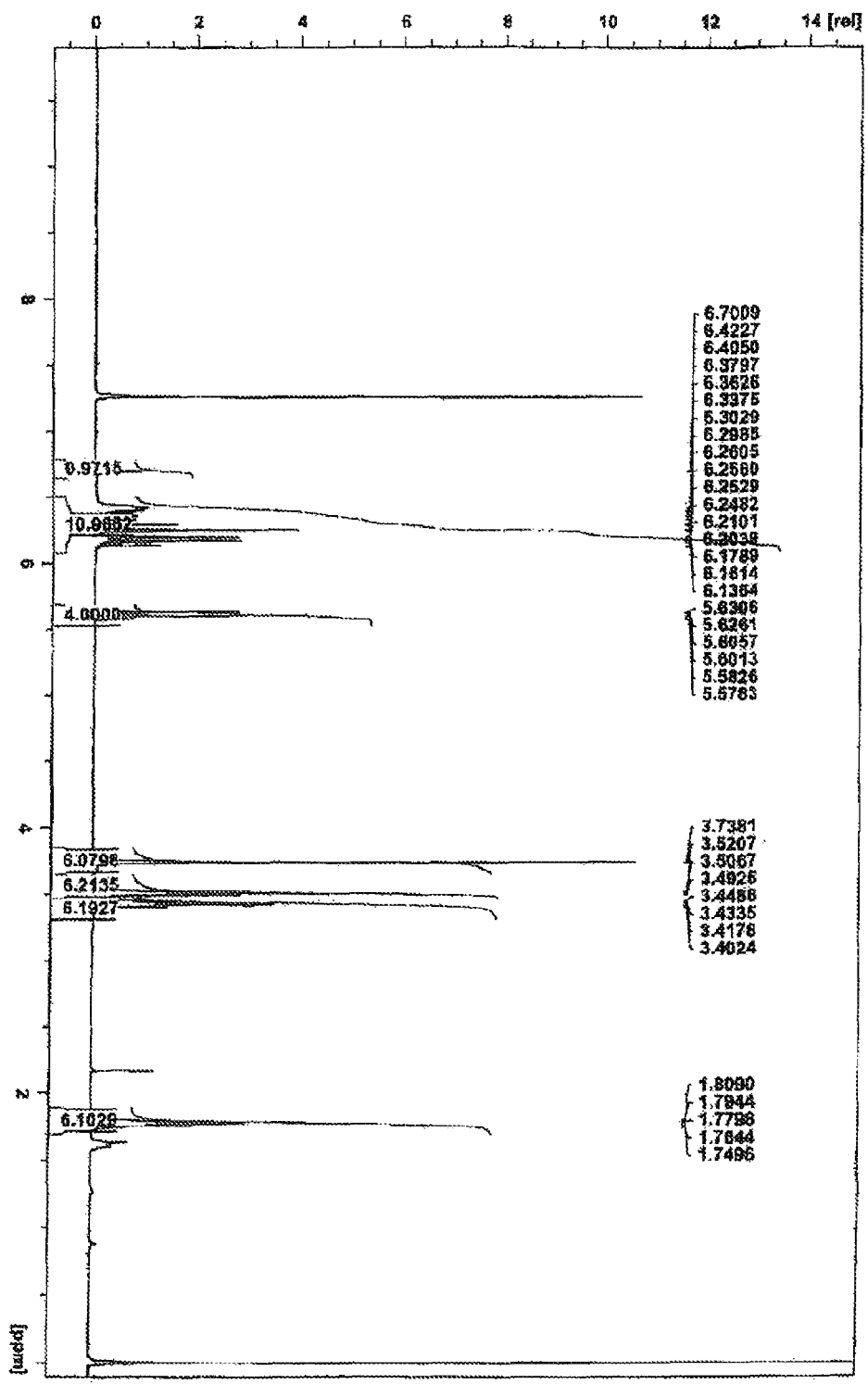
FIG. 1 is a view showing the $^1$H-NMR spectrum of the polymerizable compound 1 synthesized in Examples.

The curable composition of the present invention includes at least a polyfunctional polymerizable compound (A1) represented by the following general formula (1), and a polyfunctional polymerizable compound (A2) which differs from A1. The curable composition of the present invention particularly preferably includes a polymerization initiator (B), and if necessary, further includes a monofunctional polymerizable compound (C) and a solvent (E). Further, a sensitized dye, a coloring material, a surfactant, an anti-oxidant, an ultraviolet absorber, a color tone adjusting agent, or the like may be included according to the purposes.

Hereinafter, the polyfunctional polymerizable compound used in the present invention will be first described.

[(A) Polyfunctional Polymerizable Compound]

In the present invention, at least two kinds of polyfunctional polymerizable compounds having different chemical structures are included.

<(A1) Polyfunctional Polymerizable Compound Represented by General Formula (1)>

At least one kind of the polyfunctional polymerizable compounds used in the present invention is a polyfunctional polymerizable compound represented by the following general formula (1) (hereinafter referred to as a "component A1").

In the general formula (1), $R^1$ represents a hydrogen atom or a methyl group. $L^1$ represents a linear or branched alkylene group having 2 to 4 carbon atoms. However, $L^1$ does not have a structure in which the oxygen atom and the nitrogen atom bonded on both ends of $L^1$ are bonded to the same carbon atom of $L^1$. $L^2$ represents a divalent linking group. k represents 2 or 3. x, y, and z each independently represent integers of 0 to 6, and x+y+z equals 0 to 18.

The component A1 has four groups selected from acrylamide groups and methacrylamide groups as a polymerizable group in the molecule and has high polymerization performance and curability. By radiating, for example, actinic energy rays such as α-rays, γ-rays, X-rays, ultraviolet rays, visible rays, infrared rays, and electron beams, or energy such as heat, the composition undergoes polymerization and thus exhibits curability. Further, the component A1 is water-soluble and dissolves well in a water-soluble organic solvent such as water and an alcohol.

$R^1$ represents a hydrogen atom or a methyl group. A plurality of $R^1$'s may be the same as or different from each other. $R^1$ is preferably a hydrogen atom.

$L^1$ represents a linear or branched alkylene group having 2 to 4 carbon atoms. A plurality of $L^1$'s may be the same as or different from each other. An alkylene group of $L^1$ preferably has 3 or 4 carbon atoms, and more preferably has 3 carbon atoms, and it is particularly preferably a linear alkylene group having 3 carbon atoms. An alkylene group of $L^1$ may further have a substituent, and examples of the substituent include an aryl group and an alkoxy group.

However, in $L^1$, $L^1$ does not have a structure in which the oxygen atom and the nitrogen atom bonded on both ends of $L^1$ are bonded to the same carbon atom of $L^1$. $L^1$ is a linear or branched alkylene group linking the oxygen atom with the nitrogen atom of the (meth)acrylamide group, and in the case where the alkylene group has a branched structure, an —O—C—N— structure (hemiaminal structure) in which the oxygen atom on both ends and the nitrogen atom of the (meth)acrylamide group are bonded to the same carbon atom in the alkylene group can be considered. However, the polyfunctional polymerizable compound represented by the general formula (1) for use in the present invention does not include a compound having such a structure. When the compound has the —O—C—N— structure in the molecule, it easily decomposes at the position of the carbon atom in the structure. Particularly, the compound having the —O—C—N— structure easily decomposes during storage and the

[Chem. 4]

General Formula (1)

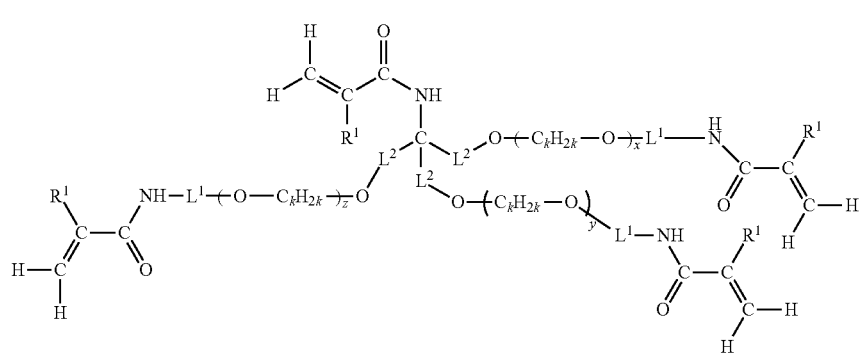

decomposition is accelerated in the presence of moisture, which reduces the storage stability of the curable composition.

Examples of the divalent linking group in $L^2$ include an alkylene group, an allylene group, a divalent heterocyclic group, or a group formed by combination thereof, and the alkylene group is preferred. Further, in the case where the divalent linking group is an alkylene group, at least one kind of group selected from —O—, —S—, and —N(Ra)— may be contained in the alkylene group. Here, Ra represents a hydrogen atom or an alkyl group having 1 to 4 carbon atoms.

Further, —O— being incorporated in the alkylene group means that the alkylene groups are connected through an oxygen atom in, for example, -alkylene-O-alkylene-. Similarly, —S— being incorporated in the alkylene group means that the alkylene groups are connected through a sulfur atom, and —N(Ra)— being incorporated in the alkylene group means that the alkylene groups are connected through —N(Ra)—.

Specific examples of the alkylene group having —O— incorporated therein include —$C_2H_4$—O—$C_2H_4$— and —$C_3H_6$—O—$C_3H_6$—.

In the case where $L^2$ contains an alkylene group, examples of the alkylene group include methylene, ethylene, propylene, butylene, pentylene, hexylene, heptylene, octylene, and nonylene. An alkylene group of $L^2$ preferably has 1 to 6 carbon atoms, more preferably has 1 to 3 carbon atoms, and particularly preferably has one carbon atom. Further, this alkylene group may further have a substituent, and examples of the substituent include an aryl group (preferably an aryl group having 6 to 14 carbon atoms, and more preferably an aryl group having 6 to 10 carbon atoms), and an alkoxy group (preferably an alkoxy group having 1 to 6 carbon atoms, and more preferably an alkoxy group 1 to 3 carbon atoms).

In the case where $L^2$ contains an allylene group, examples of the allylene group include phenylene and naphthylene. The allylene group preferably has 6 to 14 carbon atoms, more preferably has 6 to 10 carbon atoms, and particularly preferably has 6 carbon atoms. This allylene group may further have a substituent, and examples of the substituent include an alkyl group (preferably an alkyl group having 1 to 6 carbon atoms, and more preferably an alkyl group having 1 to 3 carbon atoms), and an alkoxy group (preferably an alkoxy group having 1 to 6 carbon atoms, and more preferably an alkoxy group having 1 to 3 carbon atoms).

In the case where $L^2$ contains a divalent heterocyclic group, this heterocycle is preferably a 5- or 6-membered ring and may be ring-fused. Further, the heterocycle may be an aromatic heterocycle or a non-aromatic heterocycle. Examples of the heterocycle of the divalent heterocyclic group include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, and thiazoline. Among these, an aromatic heterocycle is preferred, and pyridine, pyrazine, pyrimidine, pyridazine, triazine, pyrazole, imidazole, benzimidazole, triazole, thiazole, benzothiazole, isothiazole, benzisothiazole, and thiadiazole are more preferred.

The positions of two binding arms of the divalent heterocyclic group are not particularly limited, but for example, for pyridine, substitution at the 2-position, 3-position, and 4-position is possible and it is possible to have two binding arms at any positions.

Furthermore, the heterocycle of the divalent heterocyclic group may further have a substituent, and examples of the substituent include an alkyl group (preferably an alkyl group having 1 to 6 carbon atoms, and more preferably an alkyl group having 1 to 3 carbon atoms), an aryl group (preferably an aryl group having 6 to 14 carbon atoms, and more preferably an aryl group having 6 to 10 carbon atoms), and an alkoxy group (preferably an alkoxy group having 1 to 6 carbon atoms, and more preferably an alkoxy group having 1 to 3 carbon atoms).

k represents 2 or 3, but a plurality of k's may be the same as or different from each other. Further, $C_kH_{2k}$ may be a linear or branched structure.

x, y, and z each independently represent an integer of 0 to 6, preferably an integer of 0 to 5, and more preferably an integer of 0 to 3. x+y+z satisfies 0 to 18, preferably 0 to 15, and more preferably 0 to 9.

Specific examples of the component A1 are shown below, but the present invention is not limited thereto.

[Chem. 5]

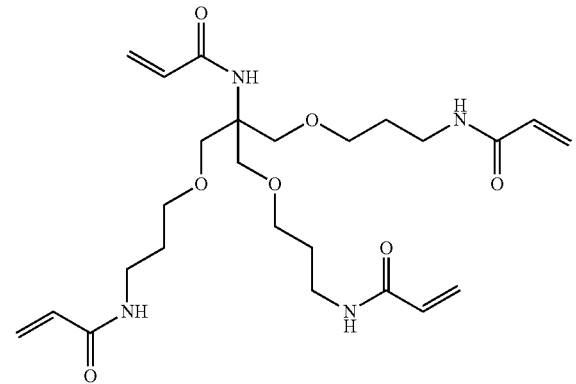

Polymerizable compound 1

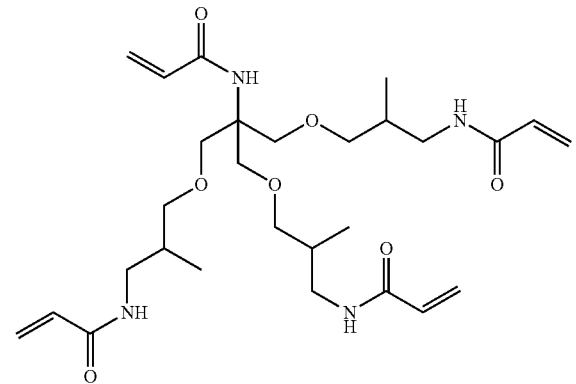

Polymerizable compound 2

Polymerizable compound 3
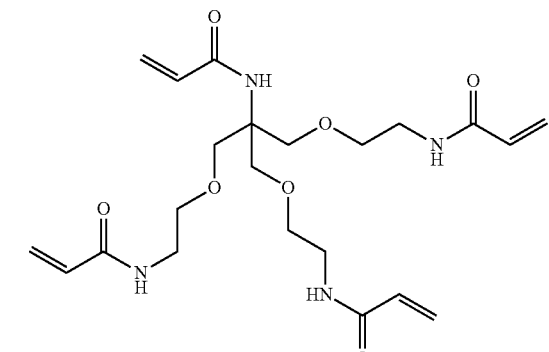
Polymerizable compound 4
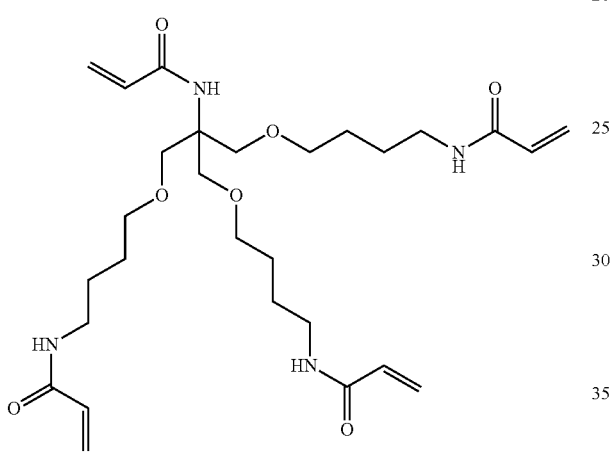
Polymerizable compound 5
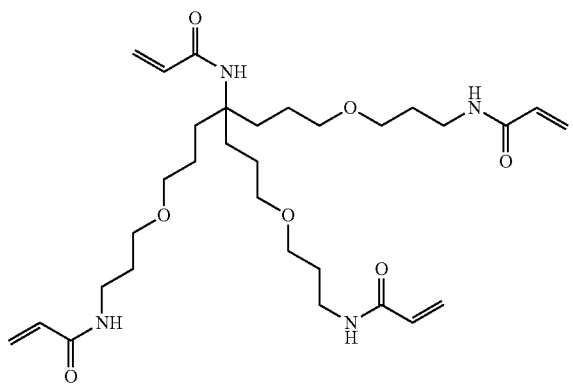
Polymerizable compound 6
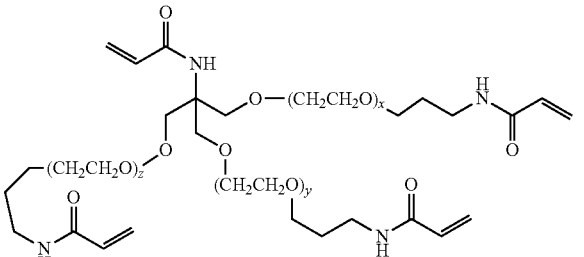
x + y + z = 9
[Chem. 6]
Polymerizable compound 7
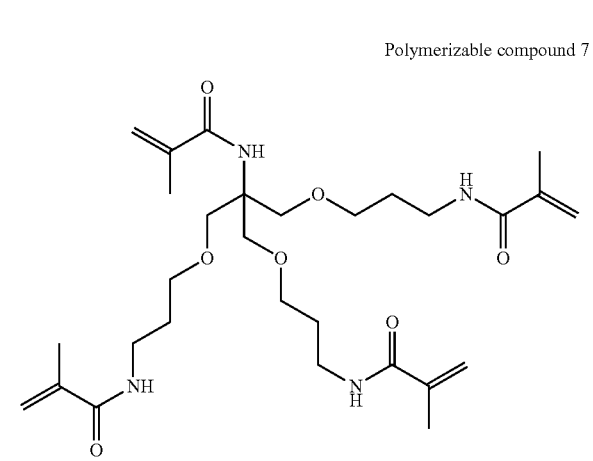
Polymerizable compound 8
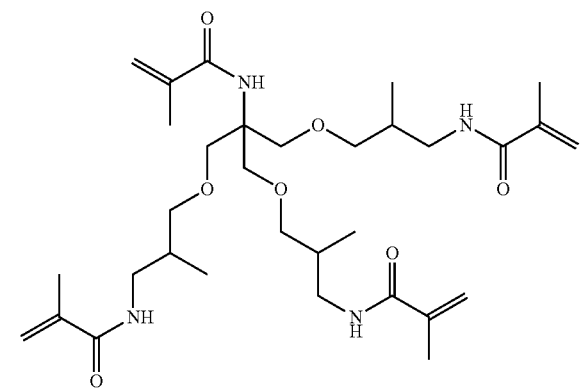
Polymerizable compound 9
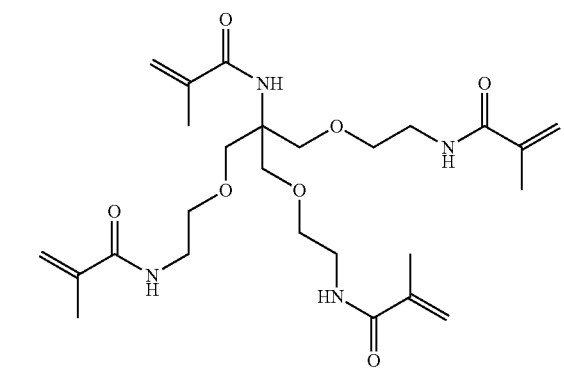

Polymerizable compound 10

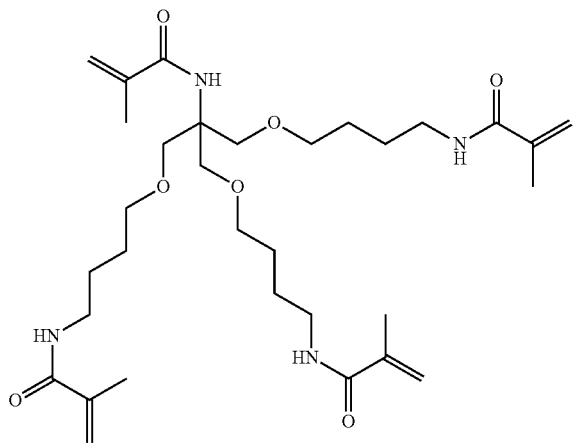

Polymerizable compound 11

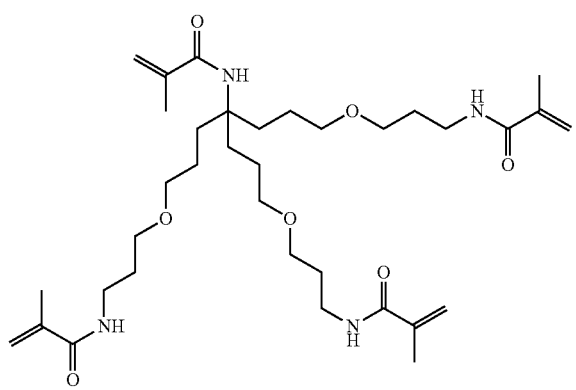

Polymerizable compound 12

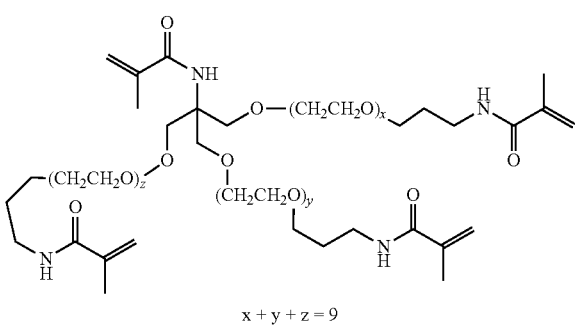

x + y + z = 9

The component A1 can be prepared by the following scheme 1 or 2, for example.

Scheme 1

[Chem. 7]

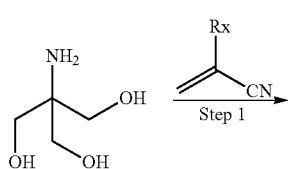

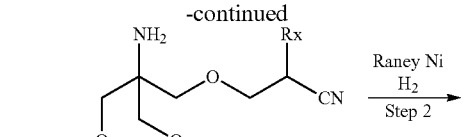

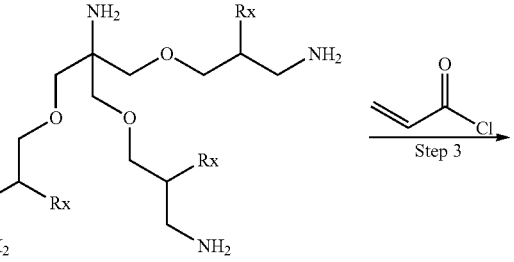

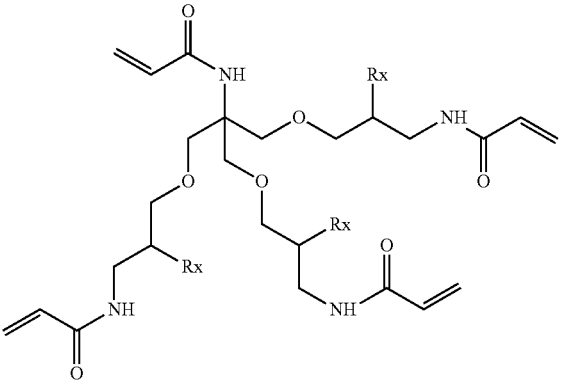

Rx = H, CH$_3$

Scheme 1

(Step 1) A step of reacting acrylonitrile with trishydroxymethylaminomethane to obtain a polycyano compound. The reaction in this step is preferably carried out at 3° C. to 60° C. for 2 to 8 hours.

(Step 2) A step of reacting the polycyano compound with hydrogen in the presence of a catalyst to obtain a polyamine compound by a reduction reaction. The reaction in this step is preferably carried out at 20° C. to 60° C. for 5 hours to 16 hours.

(Step 3) A step of carrying out an acylating reaction of the polyamine compound and acrylic acid chloride or methacrylic chloride to obtain a polyfunctional acrylamide compound. The reaction in this step is preferably carried out at 3° C. to 25° C. for 1 hour to 5 hours. Further, diacrylic acid anhydride or dimethacrylic anhydride may be used instead of the acrylic acid chloride as the acylating agent. In addition, in the acylation step, it is possible to obtain a compound having an acrylamide group and a methacrylamide group in the same molecule as a final product by using both acrylic acid chloride and methacrylic acid chloride.

Scheme 2

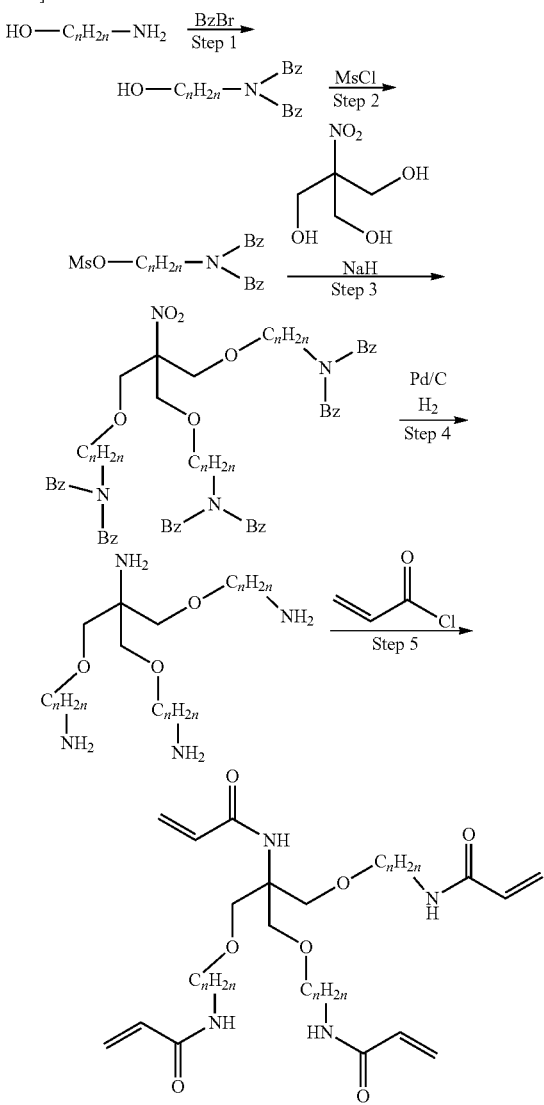

Scheme 2

(Step 1) A step of carrying out a protective group introduction reaction using a benzyl group (Bz in the scheme), a benzyloxycarbonyl group, or the like for a nitrogen atom of an aminoalcohol to obtain a nitrogen-protected aminoalcohol compound. The reaction in this step is preferably carried out at 3° C. to 25° C. for 3 hours to 5 hours.

(Step 2) A step of introducing a leaving group such as a methanesulfonyl group and a p-toluenesulfonyl group into an OH group of a nitrogen-protected aminoalcohol compound to obtain a sulfonyl compound. The reaction in this step is preferably carried out at 3° C. to 25° C. for 2 hours to 5 hours.

(Step 3) A step of carrying out an $S_N2$ reaction of the sulfonyl compound and trishydroxymethylnitromethane to obtain an aminoalcohol adduct compound. The reaction in this step is preferably carried out at 3° C. to 70° C. for 5 hours to 10 hours.

(Step 4) A step of reacting the aminoalcohol adduct compound with hydrogen in the presence of a catalyst to obtain a polyamine compound by a hydrogenation reaction. The reaction in this step is preferably carried out at 20° C. to 60° C. for 5 hours to 16 hours.

(Step 5) A step of carrying out an acylating reaction of the polyamine compound and acrylic acid chloride or methacrylic chloride to obtain a polyfunctional acrylamide compound. The reaction in this step is preferably carried out at 3° C. to 25° C. for 1 hour to 5 hours. Further, diacrylate anhydride or dimethacrylic anhydride may be used, which has been made into an acid chloride, as the acylating agent. In addition, in the acylation step, it is possible to obtain a compound having an acrylamide group and a methacrylamide group in the same molecule as a final product by using both acrylic acid chloride and methacrylic acid chloride.

The compound obtained by the above-described steps can be obtained by purification of the reaction product solution by a conventional method. For example, the compound can be purified by liquid separation and extraction using an organic solvent, crystallization using a poor solvent, column chromatography using silica gel, or the like.

For the curable composition of the present invention, a combination of two or more kinds of the polyfunctional polymerizable compound represented by the general formula (1) may also be used.

The component A1 used in the present invention includes four carbon-carbon double bonds and has high polymerizability, and thus, the curable composition can provide excellent curing performance. Therefore, when the curable composition of the present invention is used as an ink composition, an image thus formed is rapidly cured and fixed by applying actinic energy rays or energy such as heat, for example, after forming the image. As a result, it is possible to prevent off-set during printing and improve the printing speed.

Furthermore, the component A1 used in the present invention does not have an —O—C—N— structure in which three oxygen atoms derived from the hydroxyl groups of a polyol as a raw material and the (meth)acrylamide group are bonded to the same carbon atom (that is, there is no possibility that the oxygen atom and the (meth)acrylamide group are not linked through a methylene group), and thus, the hydrolysis of the compound can be inhibited. As a result, the curable composition of the present invention has high storage stability.

Further, the component A1 has good solubility in water. As a result, the curable composition of the present invention can be used as a curable composition of an aqueous medium in which water or a mixed solvent including water and a water-soluble organic solvent is used as a medium. The curable composition of the aqueous medium can reduce the use of an organic solvent having high toxicity, and thus, has excellent stability and can reduce an environmental/work load. Further, the curable composition containing a water-soluble polymerizable compound has an easily controlled viscosity, and therefore, in the case where it is used, in particular, in an ink as an ink composition, it can be suitably used as an ink for ink jet recording, for which an ejection recovery property is required.

<(A2) Polyfunctional Polymerizable Compound which Differs from Polyfunctional Polymerizable Compound Represented by General Formula (1)>

In the present invention, in combination with the component A1, a polyfunctional polymerizable compound which differs from A1 (hereinafter also referred to as a "component A2") is used.

By using a combination of the component A1 and the component A2, effects that are not obtained in the case of using only the component A1 or the component A2 can be obtained.

For example, it is possible to adjust various physical properties such as viscosity, solubility in a solvent, hardness after curing, stretchability, adhesion, a refractive index, and flexibility of the curable composition arbitrarily.

More specifically, the effects for the viscosity of the curable composition can be exerted by a combination of monomers having a low molecular weight and monomers having a small number of hydrogen-bonding functional groups, the effects for the solubility in a solvent can be exerted by a combination of monomers having a polarity close to that of a solvent used, the effects for the hardness after curing can be exerted by a combination of monomers having a high glass transition temperature (Tg) and monomers having a large number of polymerizable groups, and the effects for stretchability and flexibility can be exerted by a combination of monomers having a low glass transition temperature (Tg) and monomers having a small number of polymerizable groups.

In the curable composition of the present invention, the ratio of the content of the component A1 to the content of the component A2 is not particularly limited, but it preferably satisfies [content of A1]:[content of A2]=99:1 to 5:95, and more preferably [content of A1]:[content of A2]=95:5 to 10:90, on the basis of mass.

As the component A2, monomers having at least two ethylenically unsaturated groups are preferred, and further, the ethylenically unsaturated group is preferably a (meth)acryloyl group or a vinyl group.

As the polyfunctional compound having a (meth)acryloyl group, (meth)acrylate and (meth)acrylamide are preferred, and (meth)acrylamide is particularly preferred.

As the component A2, a compound represented by the following general formula (M1), (M2), or (M3) is preferred.

In the general formulae (M1) to (M3), $R^{a1}$ and $R^{a2}$ each independently represent a hydrogen atom or a methyl group, $Y^1$ and $Y^2$ each independently represent an alkylene group, and n1 and n2 each independently represent 0 or a number of 1 or more. $X^a$, $X^b$, and $X^c$ each represent a divalent linking group.

$R^{a1}$ and $R^{a2}$ are each preferably a hydrogen atom.

The alkylene group in $Y^1$ and $Y^2$ is preferably a linear or branched alkylene group having 2 to 4 carbon atoms, and more preferably an ethylene group or a propylene group.

Here, in the case where n1 is 2 or more, a plurality of $Y^1$'s in the repetition of a plurality of $-Y^1-O-$'s may be the same as or different from each other. Similarly, in the case where n2 is 2 or more, a plurality of $Y^2$'s in the repetition of a plurality of $-Y^2-O-$'s may be the same as or different from each other.

$X^a$ represents a divalent linking group, and examples thereof include an alkylene group, an alkylene group interrupted by an oxygen atom, and a phenylene group. An alkylene group and an alkylene group interrupted by an oxygen atom are preferred. Here, the alkylene group interrupted by an oxygen atom is a linking group such as -alkylene-O-alkylene-, -alkylene-O—, and —O-alkylene-.

The divalent linking group in $X^a$ may have a substituent, and preferred examples of the substituent include —OH, —OC(=O)C($R^{a3}$)=CH$_2$, —(O—$Y^3$)n3-OH, and —(O—$Y^3$)n3-O—C(=O)C($R^{a3}$)=CH$_2$. Here, $R^{a3}$ has the same meaning as $R^{a1}$, $Y^3$ has the same meaning as $Y^1$, and n3 has the same meaning as n1.

$X^a$ is more preferably an alkylene group, an alkylene group interrupted by an oxygen atom, or a group represented by the following formulae (L1) to (L6).

[Chem. 9]

General Formula (M1)

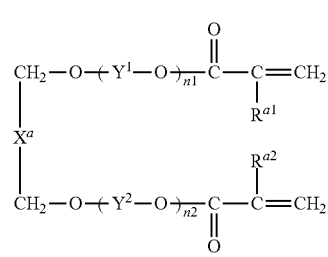

General Formula (M2)

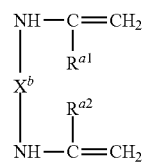

General Formula (M3)

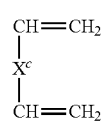

[Chem. 10]

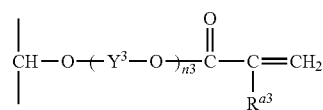 (L1)

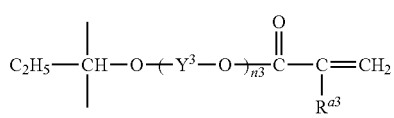 (L2)

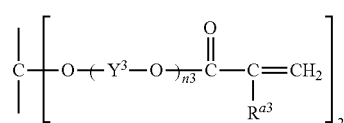 (L3)

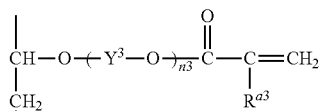 (L4)

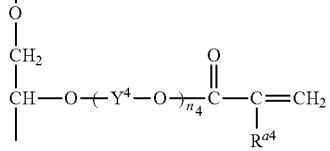

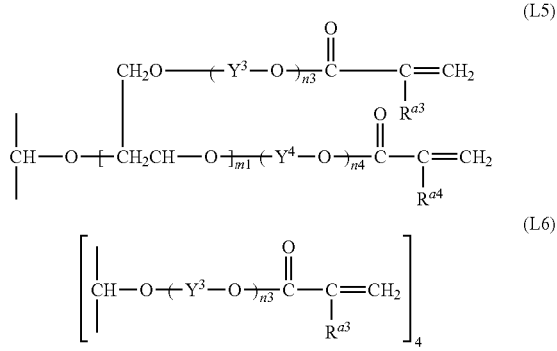

In the formulae (L1) to (L6), $R^{a3}$ has the same meaning as $R^{a1}$, $Y^3$ and $Y^4$ have the same meanings as $Y^1$, and n3 and n4 have the same meanings as n1. m1 represents a number of 1 or more.

Examples of the divalent linking group in $X^b$ include an alkylene group, an alkylene group interrupted by an oxygen atom or —N(Rx)-, and a phenylene group, and an alkylene group and an alkylene group interrupted by an oxygen atom or —N(Rx)— are preferred. Here, Rx represents a hydrogen atom or an alkyl group.

An alkylene partial structure in the alkylene group or the alkylene group interrupted by an oxygen atom preferably has 2 to 10 carbon atoms, more preferably has 2 to 6 carbon atoms, and still more preferably has 2 or 3 carbon atoms, that is, ethylene and propylene are preferred, and ethylene is more preferred.

The divalent linking group in $X^c$ is preferably, for example, an alkylene group, an alkylene group interrupted by an oxygen atom, and an allylene group, and more preferably an alkylene group or a phenylene group. The linking group may have a substituent. Examples of the substituent include a hydroxyl group, a halogen atom, an alkyl group, an alkoxy group, an acyloxy group, and an acylamino group.

Here, a divalent group such as —CH₂—O—Ar—O—CH₂—, —CH₂—O—Ar—Z—Ar—O—CH₂—, and —CH₂—O—C(=O)—Ar—C(=O)—O—CH₂— may be put between the alkylene group. Further, Ar represents an allylene group, and Z represents an alkylene group (for example, methylene, propylidene, and butylidene), —O—, or —S—.

In addition, groups in which each hydroxyl group part of a polyhydric alcohol is —OCH₂— are preferred. In this case, the compound is an allyl ether of a polyhydric alcohol.

Specific examples of the compound represented by the general formula (M1) include the following compounds in which hydroxyl groups of polyhydric alcohols are each (meth)acryloylated:

ethylene glycol, propylene glycol, glycerin, trimethylolpropane, pentaerythritol, dipentaerythrytol, diethylene glycol, dipropylene glycol, polyethylene glycol, polypropylene glycol, diglycerin, polyglycerin, sorbitan, polyoxyethylene glycerin, polyoxypropylene glyceryl ether, polyoxyethylene polyoxypropylene glyceryl ether, polyoxyethylene polyoxy propylene trimethylolpropane, polyoxypropylene diglyceryl ether, polyoxyethylene, polyoxypropylene, pentaerythrythol ether, polyoxyethylene dipentaerythrythol ether, and polyoxypropylene sorbit.

Such a polyhydric alcohol which is a raw material for synthesis is commercially available from, for example, Tokyo Chemical Industrial Co., Ltd., Sakamoto Yakuhin Kogyo Co., Ltd., or NOF Corporation, and in particular, Yuniguri G-2, Uniox G-1200, Uniol SGP-65, Uniol TG-700, Uniol TG-1000, Uniol TG-3000, Uniol TG-4000R, Unilube 50TG-32, Unilube 43TT-2500, Unilube 10TT-4500, Unilube DGP-700, Unilube DGP-700F, Unilube DGP-950, Unilube 5TP-300 KB, Uniol HS-1600D, and Uniol HS-2000D (all trade names), all manufactured by NOF Corporation, are preferably used.

In addition, the compound represented by the general formula (M1) can be easily obtained by acylating such a polyhydric alcohol with an acylating agent such as (meth)acrylic acid chloride.

Examples of the compound represented by the general formula (M2) include polyfunctional (meth)acrylamides such as methylene bis(meth)acrylamide, ethylene bis(meth)acrylamide, propylene bis(meth)acrylamide, 1,2-bis(meth)acrylaminopropane, 1,2-bis(meth)acrylamino-2-methylpropane, 2,3-dimethyl-2,3-bis(meth)acrylaminobutane, 2,2-dimethyl-1,3-bis(meth)acrylaminopropane, 3,3'-bis(meth)acrylamino-N-methyl dipropylamine, 3,3'-bis(meth)acrylaminodipropylamine, 1,3-bis(meth)acrylaminopentane, tris[3-(meth)acrylaminopropyl]amine, 2-methyl-1,3-bis(meth)acrylaminopropane, diethylene glycol bis(3-aminopropyl) ether, tris(2-aminoethyl)amine, diethylenetriamine, and triethylene triamine.

Examples of the compound represented by the general formula (M3) include divinyl alkylene glycols (for example, divinyl ethylene glycol), polyfunctional aliphatic vinyl-based monomers such as diallyloxyalkane, divinylbenzene, diallyl phthalate, and polyfunctional aromatic vinyl-based monomers such as diarylbenzene phosphonate.

In the curable composition of the present invention, the content of all the polyfunctional polymerizable compounds A including the component A1 and the component A2 (hereinafter also referred to as a "component A") is preferably from 0.1% by mass to 99.9% by mass, more preferably 0.1% by mass to 45% by mass, still more preferably 0.1% by mass to 30% by mass, particularly preferably 0.1% by mass to 20% by mass, and most preferably 1% by mass to 20% by mass. Within this range of the content of the component A, the curability can be improved and the storage stability of the curable composition can also be further improved, and therefore, this content is preferred.

In the curable composition of the present invention, in addition to the compounds represented by the general formulae (M1) to (M3) as the component A2, for example, a radically polymerizable polyfunctional oligomer or polymer may be contained as an arbitrary component. Here, the "oligomer" refers to a compound having a molecular weight of more than 1,000 and 10,000 or less. The polymer refers to a compound having a molecular weight of more than 10,000.

Furthermore, epoxy (meth)acrylates, urethane (meth)acrylates, polyester (meth)acrylates are also preferably used as a photopolymerizable polyfunctional compound. More specifically, commercially available or industrially known radically polymerizable monomers, such as those described in "Crosslinking Agent Handbook" edited by Shinzo Yamashita (Taiseisha, 1981); "UV/EB Curing Handbook (Starting Materials)" edited by Kobunshi Kankoukai, 1985; "Application and Market of UV/EB Curing Technology", p. 79, edited by RadTech (CMC, 1989); and "Polyester Resin Handbook" (The Nikkan Kogyo Shimbun Ltd., 1988) edited by Eiichiro Takiyama may be used.

(Radically Polymerizable Oligomer)

The curable composition of the present invention preferably contains a radically polymerizable oligomer as an arbitrary component. Here, the radically polymerizable oligomer is a radically polymerizable compound having a molecular weight of more than 1,000 as mentioned above, and preferably a polyfunctional oligomer containing a plurality of ethylenically unsaturated groups, and preferably 2 to 4 ethylenically unsaturated groups. The polyfunctional oligomer preferably has an ethylenic ally unsaturated group in a molecule terminal or molecule side chain of an addition polymer having a limited number (usually 5 to 100) of constitutional units, and has a weight average molecular weight of preferably more than 1,000 and 10,000 or less, and more preferably 1,000 to 5,000. The radically polymerizable oligomer preferably has a plurality of (meth)acryloxy groups.

The radically polymerizable oligomer as an arbitrary component may be any oligomer having any monomer as a constitutional unit, and examples thereof include an olefin-based oligomer (an ethylene oligomer, a propylene oligomer, a butene oligomer, and the like), a vinyl-based oligomer (a styrene oligomer, a vinyl alcohol oligomer, a vinyl pyrrolidone oligomer, an acrylate oligomer, a methacrylate oligomer, and the like), a diene-based oligomer (a butadiene oligomer, a chloroprene rubber, a pentadiene oligomer, and the like), a ring-opening polymerization type oligomer (di-, tri-, tetraethylene glycol, polyethylene glycol, polyethylimine, and the like), an addition-polymerization type oligomer (an oligoester (meth)acrylate, a polyamide oligomer, a polyisocyanate oligomer), and an addition-condensation oligomer (a phenolic resin, an amino resin, a xylene resin, a ketone resin, and the like). Among these, an oligoester (meth)acrylate is preferred, and among these, a urethane (meth)acrylate, a polyester (meth)acrylate, and an epoxy (meth)acrylate are preferred, and a urethane (meth)acrylate is more preferred.

Preferred examples of the urethane (meth)acrylate include an aliphatic urethane (meth)acrylate and an aromatic urethane (meth)acrylate, and more preferred examples thereof include an aliphatic urethane (meth)acrylate.

Furthermore, the urethane (meth)acrylate is preferably a di- to tetra-functional urethane (meth)acrylate, and more preferably a di-functional urethane (meth)acrylate. With respect to the oligomer, "Oligomer Handbook" (reviewed by Junji Furukawa, The Chemical Daily Co., Ltd.) may also be referred to.

Furthermore, as a commercially available radically polymerizable oligomer, examples of urethane (meth)acrylates include R1204, R1211, R1213, R1217, R1218, R1301, R1302, R1303, R1304, R1306, R1308, R1901, and R1150 manufactured by Dai-Ichi Kogyo Seiyaku Co., Ltd., the EBECRYL series (for example, EBECRYL 230, 270, 4858, 8402, 8804, 8807, 8803, 9260, 1290, 1290 K, 5129, 4842, 8210, 210, 4827, 6700, 4450, and 220) manufactured by Daicel-Cytec Company Ltd., NK Oligo U-4HA, U-6HA, U-15HA, U-108A, and U200AX manufactured by Shin-Nakamura Chemical Co., Ltd., Aronix M-1100, M-1200, M-1210, M-1310, M-100, and M-1960 manufactured by Toagosei Co., Ltd., and CN964 manufactured by Sartomer Japan Co., Ltd.

Examples of polyester (meth)acrylates include the EBECRYL series (for example, EBECRYL 770, IRR 467, 81, 84, 83, 80, 675, 800, 810, 812, 1657, 1810, IRR 302, 450, 670, 830, 870, 1830, 1870, and 2870, IRR 267 and 813, and IRR 483 and 811) manufactured by Daicel-Cytec Company Ltd. and Aronix M-6100, M-6200, M-6250, M-6500, M-7100, M-8030, M-8060, M-8100, M-8530, M-8560, and M-9050 manufactured by Toagosei Co., Ltd.

Examples of epoxy (meth)acrylates include the EBECRYL series (for example, EBECRYL 600, 860, 2958, 3411, 3600, 3605, 3700, 3701, 3703, 3702, and 3708, and RDX 63182 and 6040) manufactured by Daicel-Cytec Company Ltd.

[(B) Polymerization Initiator]

The curable composition of the present invention preferably includes a polymerization initiator. The polymerization initiator is not particularly limited, as long as the polymerization initiator can polymerize the component A1, and a normal radical polymerization initiator can be used. The radical polymerization initiator is a compound which generates a radical polymerization initiation species by absorbing an external energy. The radical polymerization initiators are classified broadly into a radical polymerization initiator in which the external energy for initiating the polymerization is heat and a radical polymerization initiator in which the external energy is an actinic energy ray. However, in the present invention, the photopolymerization initiator which generates the radical polymerization initiation species by an actinic energy ray is preferably used.

Among them, a water-soluble photopolymerization initiator or an aqueous dispersion of a water-insoluble photopolymerization initiator is preferably used, and a water-soluble photopolymerization initiator is more preferable. Moreover, the term, water-soluble for a photopolymerization initiator has the meaning of 0.5% by mass or more being dissolved in distilled water at 25° C., 1% by mass or more of the water-soluble photopolymerization initiator described above more preferably dissolves in distilled water at 25° C., and 3% by mass or more particularly preferably dissolves.

Examples of a photopolymerization initiator which can be used in the curable composition of the present invention include aromatic ketones, an acylphosphine compound, an aromatic onium salt compound, an organic peroxide, a thio compound, a hexaarylbiimidazole compound, a ketoxime ester compound, a borate compound, an azinium compound, a metallocene compound, an active ester compound, a compound having a carbon-halogen bond, and an alkylamine compound.

Preferred examples of the aromatic ketones include an acylphosphine oxide compound, and a thio compound, compounds having a benzophenone skeleton or a thioxanthone skeleton described in "RADIATION CURING IN POLYMER SCIENCE AND TECHNOLOGY", J. P. FOUASSIER, J. E RABEK (1993), pp. 77 to 117, or the like. More preferred examples thereof include the α-thiobenzophenone compound described in JP1972-6416B (JP-547-6416B), the benzoin ether compound described in JP1972-3981B (JP-547-3981B), the α-substituted benzoin compound described in JP1972-22326B (JP-547-22326B), the benzoin derivative described in JP1972-23664B (JP-547-23664B), the aroylphosphonic ester described in JP1982-30704A (JP-557-30704A), the dialkoxybenzophenone described in JP1985-26483B (JP-560-26483B), the benzoin ether described in JP1985-26403B (JP-560-26403B) and JP1987-81345A (JP-562-81345A), the α-aminobenzophenone described in JP1989-34242B (JP-H01-34242B), U54318791A, and EP0284561A, the p-di(dimethylaminobenzoyl)benzene described in JP1990-211452A (JP-H02-211452A), the thio-substituted aromatic ketones described in JP1986-194062A (JP-561-194062A), the acylphosphine sulfide described in JP1990-9597B (JP-H02-9597B), the acylphosphine described in JP1990-9596B (JP-502-9596B), the thioxanthones described in JP1988-61950B (JP-563-61950B), and the coumarins described in JP1984-42864B (JP-559-42864B). Other preferred examples of the polymerization initiator include the polymerization initiators described in JP2008-105379A and JP2009-114290A. In addition, other examples thereof include the polymerization initiators described in "Ultraviolet light Curing System" authored by Kiyomi KATO (General Technology Center Publication, 1989), pp. 65 to 148.

Among these, the photopolymerization initiator may be an aromatic ketone or an acylphosphine oxide compound. Particularly, p-phenyl benzophenone (manufactured by Wako Pure Chemical Industries, Ltd.), bis(2,4,6-trimethylbenzoyl)phenylphosphine oxide (Irgacure 819, manufactured by BASF Japan Ltd.), 2,4,6-trimethylbenzoyl diphenylphosphine oxide (Darocur TPO, manufactured by BASF Japan Ltd.), 2-benzyl-2-dimethylamino-1-(4-morpholinophenyl)-butanone-1 (Irgacure 369, manufactured by BASF Japan Ltd.), 2-methyl-1-(4-methylthiophenyl)-2-morpholinopropan-1-one (Irgacure 907, manufactured by BASF Japan Ltd.), and 1-[4-(2-hydroxyethoxy)-phenyl]-2-hydroxy-2-methyl-1-propan-1-one (Irgacure 2959, manufactured by BASF Japan Ltd.) are preferred, and Irgacure 2959 (manufactured by BASF Japan Ltd.) is most preferred, from the viewpoint of water solubility and hydrolysis resistance.

The curable composition of the present invention may include one kind or two or more kinds of the polymerization initiator.

The content of the polymerization initiator in the curable composition of the present invention is preferably from 0.1% by mass to 20% by mass in solid content conversion, more preferably from 0.5% by mass to 10% by mass, and particularly preferably from 1.0% by mass to 5% by mass, in terms of the content with respect to the total amount of the curable composition.

[(C) Monofunctional Polymerizable Compound]

The curable composition of the present invention preferably further includes a monofunctional polymerizable compound C (hereinafter, referred to as a component C), in addition to the component A1 and the component A2. Examples of the monofunctional polymerizable compound which can be used in the present invention include the (meth)acrylate compound, the (meth)acrylamide compound, the vinyl ether compound, the aromatic vinyl compound, and the N-vinyl compound (a polymerizable monomer having an amide bond), described in JP2008-208190A or JP2008-266561A. Among these, the (meth)acrylamide compound, the vinyl ether compound, the aromatic vinyl compound, and the N-vinyl compound (a polymerizable oligomer having an amide bond) are preferably used, and a (meth)acrylamide compound is particularly preferably used, from the viewpoint of enhancing the storage stability. In addition, the (meth)acrylamide compound is preferably used, from the viewpoint of curability.

Particularly, in view of having both of the storage stability and the curability, a monofunctional polymerizable compound having a (meth)acrylamide structure is preferably used as the component C.

As the monofunctional polymerizable compound having a (meth)acrylamide structure used in the present invention, a compound represented by the following general formula (MA) is preferred.

[Chem. 11]

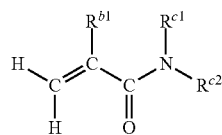

General Formula (MA)

In the general formula (MA), $R^{b1}$ represents a hydrogen atom or a methyl group, and $R^{c1}$ represents a hydrogen atom, a methyl group, or an ethyl group, and $R^{c2}$ represents an alkyl group. Here, $R^{c1}$ and $R^{c2}$ may be bonded to each other to form a 5- to 8-membered ring.

$R^{b1}$ is preferably a hydrogen atom. $R^{c1}$ is preferably a hydrogen atom or a methyl group, and more preferably a hydrogen atom.

$R^{c2}$ is preferably a linear or branched alkyl group having 1 to 6 carbon atoms (for example, methyl, ethyl, propyl, butyl, pentyl, or hexyl), more preferably an alkyl group having 2 to 4 carbon atoms, and particularly preferably an alkyl group having 2 or 3 carbon atoms.

$R^{c2}$ may be an alkyl group having a substituent, and examples of the substituent include an acyl group, a hydroxyl group, an amino group, an alkylamino group, an arylamino group, a heterocyclic amino group (among these, a tertiary amino group is preferred), a quaternary ammonium group, and a sulfo group. Among these, an acyl group, a hydroxyl group, or a dialkylamino group is preferably contained, and a hydroxyl group is more preferably contained.

A substituent in the case where $R^{c2}$ is an alkyl group having a substituent will be described below.

In the case where the substituent contained in the alkyl group is an acyl group, the acyl group is represented by —CO—R' (R' is an alkyl group), the acyl group preferably having 2 to 4 carbon atoms, more preferably having 2 or 3 carbon atoms, and particularly preferably having 2 carbon atoms. Examples of the acyl group include —COCH$_3$.

In the case where the substituent contained in the alkyl group is a tertiary amino group, the tertiary amino group is represented by —N(R")$_2$ (R" is a substituent). R" is preferably a linear or branched alkyl group having 1 to 8 carbon atoms, more preferably an alkyl group having 1 to 4 carbon atoms, and particularly preferably an alkyl group having 1 or 2 carbon atoms. Two R"s may be the same as or different from each other. Examples of the tertiary amino group include dimethylamino and diethylamino.

In the case where the substituent contained in the alkyl group is a quaternary ammonium group, the quaternary ammonium group is represented by —N$^+$(R''')$_3$ (R''' is a substituent). R''' is preferably a linear or branched alkyl group having 1 to 8 carbon atoms, more preferably an alkyl group having 1 to 4 carbon atoms, and particularly preferably an alkyl group having 1 or 2 carbon atoms. Three R'''s may be the same as or different from each other. Examples of the quaternary ammonium group include trimethylammonium and triethylammonium. In addition, examples of a counter anion of the quaternary ammonium group include halide ions such as a chloride ion, a bromide ion, and iodide ion, and a sulfate ion.

In the case where the substituent contained in the alkyl group is a sulfo group, examples of the sulfo group include a sulfo group (—SO$_3$H) and a salt thereof (—SO$_3^-$X$^+$). In the case of a salt, examples of the cation (X$^+$) include Li$^+$, Na$^+$, K$^+$, an ammonium cation, and a tetramethylammonium cation.

$R^{c1}$ and $R^{c2}$ may be bonded to each other to form a 5- to 8-membered ring (preferably a 5- or 6-membered ring). The ring thus formed may include at least one kind selected from —O—, —S—, and —N(Ra)— as a ring-constituting atom or group, and among these, —O— is more preferably included as a ring-constituting atom.

Here, Ra represents a hydrogen atom or an alkyl group having 1 to 4 carbon atoms, preferably a hydrogen atom or a methyl group, and more preferably a hydrogen atom.

Specific examples of the monofunctional polymerizable compound having a (meth)acrylamide structure represented by the general formula (MA) are shown below, but the present invention is not limited thereto.

[Chem. 12]

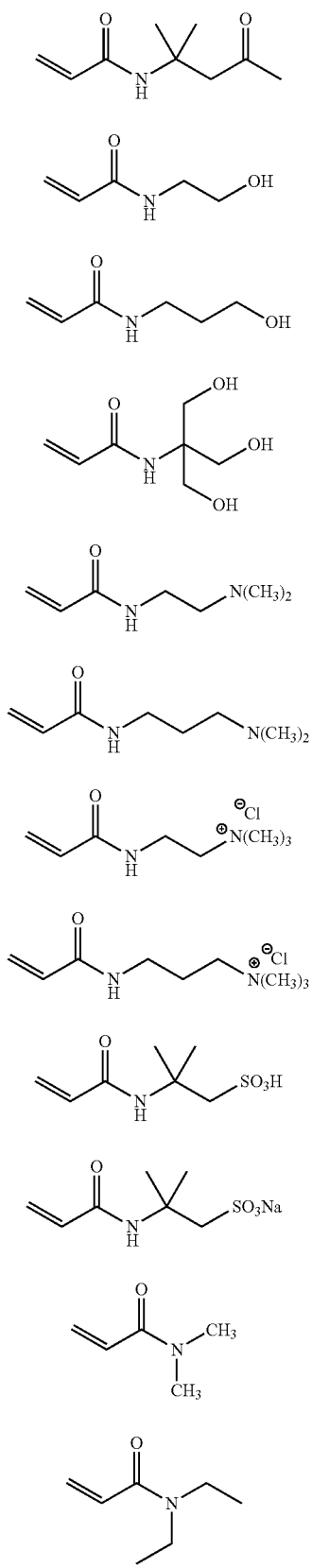

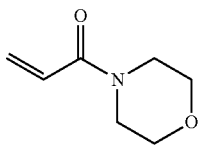

As the monofunctional polymerizable compound represented by the general formula (MA), commercially available products can be used.

As the compounds (C-1) to (C-13), the following compounds, for example, are available.

(C-1): Diacetone acrylamide (manufactured by KYOWA-HAKKO CHEMICAL Co., Ltd.)
(C-2): Hydroxyethyl acrylamide (manufactured by Kohjin Co., Ltd.)
(C-3): Hydroxypropyl acrylamide (manufactured by Fluka Co., Ltd.)
(C-4): N-[1,1-Bis(hydroxymethyl)-2-hydroxyethyl]propenamide (manufactured by Aldrich Co., Ltd.)
(C-5): N-(2-Dimethylaminoethyl)acrylamide (manufactured by Aldrich Co., Ltd.)
(C-6): Dimethylaminopropylacrylamide (manufactured by Kohjin Co., Ltd.)
(C-7): 2-(Acryloyloxy)-N,N,N-trimethylethanaminium chloride (manufactured by Kohjin Co., Ltd.)
(C-8): (3-Acrylamidepropyl)trimethylammonium chloride (manufactured by Kohjin Co., Ltd.)
(C-9): 2-Acrylamide-2-methylpropanesulfonic acid (manufactured by Toagosei Co., Ltd.)
(C-10): N-[1,1-Dimethyl-2-(sodiooxysulfonyl)ethyl]acrylamide (manufactured by Aldrich Co., Ltd.)
(C-11): N,N-Dimethyl acrylamide (manufactured by Kohjin Co., Ltd.)
(C-12): N,N-Diethyl acrylamide (manufactured by Kohjin Co., Ltd.)
(C-13): 4-Acryloylmorpholine (manufactured by Kohjin Co., Ltd.)

The content of the monofunctional polymerizable compound C (component C) in the curable composition of the present invention is preferably from 0.1% by mass to 99.8% by mass, more preferably from 1% by mass to 45% by mass, even more preferably from 2% by mass to 35% by mass, and particularly preferably from 10% by mass to 20% by mass. Within the above range of the content of the component C, preferably, both of the desired curability and flexibility can be provided.

With respect to the ratio of the content of the component A to the content of the component C in the curable composition of the present invention, [content of A]:[content of C]=1:99 to 90:10 is preferred, [content of A]:[content of C]=10:90 to 70:30 is more preferred, [content of A]:[content of C]=15:85 to 65:35 is more preferred, and [content of A]:[content of C]=20:80 to 55:45 is particularly preferred, in terms of mass ratio. If the ratio of the contents of the component A and the component C is within this range, the curable composition has excellent curability and storage stability, and therefore, in the case where the curable composition of the present invention is used as an ink, preferably, the composition exhibits excellent performance in both of the ejection recovery property and the flexibility of an image.

When the curable composition of the present invention further includes, in addition to the component A, the component C (particularly preferably a monofunctional polymerizable compound having a (meth)acrylamide structure), in particular, the viscosity adjusting ability of the ink is superior. Thus, in the case where the curable composition of the present invention is used as an ink composition, an ejection recovery property after stopping of printing and leaving for a predetermined time and the flexibility of the formed image are enhanced in an ink jet mode. The mechanism is not sufficiently clarified, but after ejecting the ink composition, when water evaporates from the ink composition and the ink composition is concentrated while the ejecting head part is left, increase in viscosity is reduced, and thus, it is presumed that an ejection recovery property is enhanced. In addition, in the case where only polyfunctional polymerizable compounds are used, since a crosslinked structure is strongly formed, there is some possibility of a cured film (image) becoming brittle, however, by using the monofunctional polymerizable compound in combination, it is possible to decrease the density of the degree of crosslinkage in the cured film, and as a result, it is considered that moderate flexibility can be imparted to the cured film. Moreover, the mechanism is conjecture and the present invention is not limited to this mechanism.

[(D) Coloring Material]

The curable composition of the present invention may include various coloring materials. The curable composition including the coloring material can suitably be used as an ink composition.

Further, in the present specification, the "ink composition" encompasses a clear ink (colorless ink) composition which does not include a coloring material. Further, in the present specification, the "ink composition" and the "composition for an ink" have the same meanings.

As the coloring material, ordinary dyes, pigments, or the like can be used without particular limitation. Among these, from the viewpoint of the ink colorability, a coloring material which is almost insoluble or is slightly soluble in water is preferably used. Specific examples of the coloring material include various kinds of pigments, disperse dyes, oil-soluble dyes, and dyes which form a J-aggregate, but among these, a pigment is preferred from the viewpoint of light resistance. As the pigment, any of an organic pigment and an inorganic pigment can be used.

Examples of the organic pigment include an azo pigment, a polycyclic pigment, a dye chelate, a nitro pigment, a nitroso pigment, and aniline black. Among these, an azo pigment, a polycyclic pigment, and the like are preferred. Examples of the azo pigment include an azo lake, an insoluble azo pigment, a condensed azo pigment, and a chelate azo pigment. Examples of the polycyclic pigment include a phthalocyanine pigment, a perylene pigment, a perinone pigment, an anthraquinone pigment, a quinacridone pigment, a diketopyrrolopyrrole pigment, a dioxazine pigment, an indigo pigment, a thioindigo pigment, an isoindoline pigment, and a quinophthalone pigment. As the dye chelate, a basic dye type chelate, an acid dye type chelate, or the like can be used.

As the inorganic pigment, titanium oxide, iron oxide, calcium carbonate, barium sulfate, aluminum hydroxide, barium yellow, cadmium red, chrome yellow, or carbon black can be used. Among these, carbon black is particularly preferred, and carbon black manufactured by a well-known method such as a contact method, a furnace method, or a thermal method, can be used.

More specific examples thereof include the pigments described in paragraph Nos. 0142 to 0145 of JP2007-100071A, and the like, and they are preferably used in the curable composition of the present invention.

In the curable composition of the present invention, a coloring material may be used singly or may be used by selecting and combining a plurality of kinds of coloring material.

In the case where the curable composition of the present invention is used as an ink composition, the content of the coloring material in the ink composition is preferably from 0.5% by mass to 20% by mass, more preferably from 1% by mass to 15% by mass, and particularly from 2% by mass to 10% by mass, with respect to the total amount of the ink composition, from the viewpoint of color consistency, graininess, ink stability, and ejection reliability.

<Pigment Dispersion>

In the case where the curable composition of the present invention includes a pigment, a dispersion in which a pigment is dispersed in an aqueous medium by a dispersant (hereinafter, referred to as a colored particle dispersion) is preferably used. The pigments described above can be used. As the dispersant, a polymeric dispersant, a low-molecular weight surfactant type dispersant, or the like can be used, and a polymeric dispersant is preferred.

The colored particle dispersion is preferably a colored particle dispersion in which after the pigment is dispersed in an aqueous medium by polymeric dispersants, the polymeric dispersants are crosslinked to each other by adding a crosslinking agent, and at least a part of the surface of the pigment is covered by a crosslinked polymer, from the viewpoint of the dispersion stability of the pigment particles and ejecting properties in a case of applying to an ink jet method when the colored particle dispersion is used as an ink composition.

As a polymeric dispersant, a water-soluble polymeric dispersant and a water-insoluble polymeric dispersant can be used, but a water-insoluble polymeric dispersant is preferred from the viewpoint of the dispersion stability of the pigment particles and the ejecting properties in the case of applying to an ink jet method.

<Water-Insoluble Polymeric Dispersant>

The water-insoluble polymeric dispersant which can be used in the present invention is not particularly limited and as long as it is possible to disperse the pigment, an ordinary water-insoluble polymeric dispersant can be used. For example, a polymer consisting of a hydrophobic constitution unit and a hydrophilic constitution unit can be used as a water-insoluble polymeric dispersant.

Examples of the monomer which is the hydrophobic constitution unit include a styrene-based monomer, alkyl (meth)acrylate and an aromatic group-containing (meth)acrylate.

The monomer which is the hydrophilic constitution unit is not particularly limited as long as a monomer includes a hydrophilic group, and examples of the hydrophilic group include a nonionic group, a carboxyl group, a sulfonate group, and a phosphate group. Moreover, examples of the nonionic group include a hydroxy group, an amide group (in which a nitrogen atom is unsubstituted), a group derived from an alkylene oxide polymer (for example, polyethylene oxide and polypropylene oxide), and a group derived from a sugar alcohol. The hydrophilic constitution unit preferably includes at least a carboxyl group and also preferably includes both of a nonionic group and a carboxyl group, from the viewpoint of dispersion stability.

Specific examples of the water-insoluble polymeric dispersant include a styrene-(meth)acrylic acid copolymer, a styrene-(meth)acrylic acid-(meth)acrylic ester copolymer, a (meth)acrylic ester-(meth)acrylic acid copolymer, a polyethylene glycol (meth)acrylate-(meth) acrylic acid copolymer, and a styrene-maleic acid copolymer.

The water-insoluble polymeric dispersant is preferably a vinyl polymer including a carboxyl group, and more preferably a vinyl polymer having at least a constitution unit derived from an aromatic group-containing monomer as a hydrophobic constitution unit and having a constitution unit including a carboxyl group as a hydrophilic constitution unit, from the viewpoint of the dispersion stability of the pigment.

The weight average molecular weight of the water-insoluble polymeric dispersant is preferably from 3,000 to 200,000, more preferably from 5,000 to 100,000, even more preferably from 5,000 to 80,000, and particularly preferably from 10,000 to 60,000, from the viewpoint of the dispersion stability of the pigment.

Moreover, the weight average molecular weight is measured by gel permeation chromatography (GPC). In GPC, HLC-8020 GPC (manufactured by TOSOH Corporation) is used, TSKgel Super HZM-H, TSKgel Super HZ4000 and TSKgel Super HZ200 (manufactured by TOSOH Corporation, 4.6 mm ID×15 cm) as a column, and tetrahydrofuran (THF) as an eluent being used.

The coloring material which is included in the curable composition of the present invention is preferably configured by including the pigment and the water-insoluble polymeric dispersant, and is preferably colored particles which are configured by at least a part of the surface of the pigment being covered by the water-insoluble polymeric dispersant.

Such colored particles, for example, can be obtained as a colored particle dispersion by dispersing a mixture including a pigment, a dispersant, and a solvent (preferably an organic solvent) as necessary, or the like by using a disperser. Specifically, for example, after a step of adding an aqueous liquid including a basic substance to a mixture of the pigment, the water-insoluble polymeric dispersant, and an organic solvent for dissolving or dispersing the dispersant (a step of mixing and hydrating), it is possible to prepare the colored particle dispersion by providing a step of removing the organic solvent (a step of removing a solvent). According to the method, the pigment is finely dispersed, and thus, it is possible to obtain the colored particle dispersion having excellent storage stability.

The volume average particle diameter of the colored particle dispersion is preferably from 10 nm to 200 nm, more preferably from 10 nm to 150 nm, and particularly preferably from 10 nm to 100 nm. Further, in the case where the colored particle dispersion is used in an ink composition, with a volume average particle diameter of 200 nm or less, the color reproducibility becomes favorable, and further, the droplet shooting characteristics become favorable in a case of an ink jet method. In addition, with a volume average particle diameter of 10 nm or more, the light resistance becomes favorable.

The particle diameter distribution of the colored particles (the coloring material) is not particularly limited, and may be any one having a wide particle size distribution or having a monodispersed particle diameter distribution. In addition, two or more kinds of the coloring material having a monodispersed particle diameter distribution may be mixed and used. In addition, the volume average particle diameter and the particle diameter distribution, for example, can be measured using a light scattering method.

In the curable composition of the present invention, such a colored particle dispersion may be used singly or in combination of two or more kinds thereof.

In the colored particle dispersion, the dispersant is used in an amount of preferably 10% by mass to 100% by mass, more preferably 20% by mass to 70% by mass, and particularly preferably 30% by mass to 50% by mass, with respect to the pigment. By setting the content of the dispersant to the pigment to the above-described range, the pigment particle is covered by the dispersant with a suitable quantity, and thus, it is possible to obtain colored particles having excellent dispersibility, dispersion stability, and colorability.

The colored particle dispersion may include another dispersant in addition to the water-insoluble polymeric dispersant. For example, a water-soluble low molecular weight dispersant, a water-soluble polymer which is usually used, or the like can be used. The dispersants except the water-insoluble polymeric dispersant can be used within the range of the above-described content of the dispersant.

[(E) Solvent]

The curable composition of the present invention preferably includes a solvent. Examples of the solvent include water, an organic solvent, and a mixture thereof. Further, in the case where all or a part of the component A or all or a part of the component C are a solution, the solution component of the component A or the component C can be allowed to perform a function as a solvent. In this case, an embodiment in which the curable composition of the present invention does not include a solvent can be adopted. The curable composition of the present invention has high stability even when an aqueous medium is used. In the case where water is used as a solvent, water such as deionized water and distilled water, which does not include ionic impurities, is more preferably used. In the case where the curable composition of the present invention includes water as a solvent, the content of water in the curable composition is preferably from 10% by mass to 95% by mass, more preferably from 30% by mass to 90% by mass, and particularly preferably from 50% by mass to 80% by mass.

In the case where the curable composition of the present invention is used as an ink composition, an organic solvent may be included as a solvent from the viewpoint that an anti-drying effect or a penetration enhancement effect of an ink with respect to paper can be expected. Further, it is preferable to use a combination of an organic solvent and water. Considering a use in combination with water, a water-soluble organic solvent is more preferably used as the organic solvent. In addition, in order to prevent an ink ejection port from clogging due to the curable composition which adheres in the vicinity of an ink ejection port of an injection nozzle drying and solidifying, an organic solvent having a lower vapor pressure than that of water is preferably used.

Examples of the organic solvent which can be used in the present invention include alkanediols (polyhydric alcohols) such as glycerin, 1,2,6-hexanetriol, trimethylolpropane, ethylene glycol, and propylene glycol; sugar alcohols; alkyl alcohols having 1 to 4 carbon atoms, such as ethanol, methanol, butanol, propanol, and isopropanol; and glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-isopropyl ether, diethylene glycol mono-isopropyl ether, ethylene glycol mono-n-butyl ether, ethylene glycol mono-t-butyl ether, diethylene glycol mono-t-butyl ether, triethylene glycol monoethyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol, dipropylene glycol monomethyl ether, dipropylene glycol monoethyl ether, dipropylene glycol mono-n-propyl ether, dipropylene glycol mono-isopropyl ether, and tripropylene glycol monomethyl ether.

For the purpose of preventing drying, polyhydric alcohols are useful. Examples thereof include glycerin, ethylene glycol, diethylene glycol, triethylene glycol, propylene glycol, dipropylene glycol, tripropylene glycol, 1,3-butanediol, and 2,3-butanediol.

For the purpose of enhancing the penetration, an aliphatic diol is suitable. Examples of the aliphatic diol include 2-ethyl-2-methyl-1,3-propanediol, 3,3-dimethyl-1,2-butanediol, 2,2-diethyl-1,3-propanediol, 2-ethyl-1,3-hexanediol, and 2,2,4-trimethyl-1,3-pentanediol. Among these, preferred examples thereof include 2-ethyl-1,3-hexanediol and 2,2,4-trimethyl-1,3-pentanediol.

In addition, in the case where the curable composition of the present invention is used as an ink composition, at least one kind of the compound represented by the following general formula (S) is preferably included as an organic solvent, from the point of inhibiting the occurrence of curling in a recording medium.

[Chem. 13]

General Formula (S)

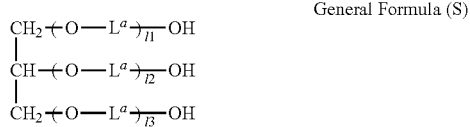

In the general formula (S), $L^a$ represents an alkylene group. l1, l2, and l3 each independently represent an integer of 1 or more, and satisfy l1+l2+l3=3 to 15.

$L^a$ is preferably ethylene or propylene, and more preferably propylene. Here, when l1, l2, and l3 are 2 or more, a plurality of —O-$L^a$-'s may be the same as or different from each other.

l1+l2+l3 is preferably in the range of 3 to 12, and more preferably in the range of 3 to 10. When the value of l1+l2+l3 is 3 or more, good curl inhibiting ability is shown, and when the value is 15 or less, a good ejection property can be obtained.

Specific examples of the compound represented by the following general formula (S) are shown below. Further, in the following compounds, a description of "POP(3) glyceryl ether" has the meaning of a glyceryl ether in which three propyleneoxy groups in total are bonded to glycerin, and other description is the same.

[Chem. 14]

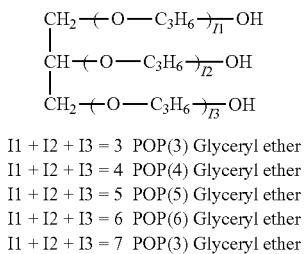

l1 + l2 + l3 = 3   POP(3) Glyceryl ether
l1 + l2 + l3 = 4   POP(4) Glyceryl ether
l1 + l2 + l3 = 5   POP(5) Glyceryl ether
l1 + l2 + l3 = 6   POP(6) Glyceryl ether
l1 + l2 + l3 = 7   POP(3) Glyceryl ether Moreover, inclusion of the following compounds (a) to (g) as an organic solvent is also preferred from a viewpoint of suppressing the occurrence of curling in a recording medium. Moreover, AO represents at least one of ethyleneoxy (EO) (—$CH_2CH_2O$—) and propyleneoxy (PO) (—$C_3H_6O$—).

(a) n-$C_4H_9O(AO)_4$—H (AO=EO or PO, and the ratio is EO:PO=1:1) (manufactured by NOF Corporation)

(b) n-$C_4H_9O(AO)_{10}$—H (AO=EO or PO, and the ratio is EO:PO=1:1) (manufactured by NOF Corporation)

(c) HO$(AO)_{40}$—H (AO=EO or PO, and the ratio is EO:PO=1:3) (manufactured by NOF Corporation)

(d) HO$(AO)_{55}$—H (AO=EO or PO, and the ratio is EO:PO=5:6) (manufactured by NOF Corporation)

(e) HO$(PO)_3$—H (PP-200, manufactured by Sanyo Chemical Industries, Ltd.)

(f) HO$(PO)_7$—H (PP-400, manufactured by Sanyo Chemical Industries, Ltd.)

(g) 1,2-Hexanediol (manufactured by Ube Industries, Ltd.)

In the present invention, the organic solvent is used singly or as a mixture of two or more kinds thereof. The content of the organic solvent is preferably from 0% by mass to 40% by mass, more preferably from 0% by mass to 20% by mass, and particularly preferably from 0% by mass to 10% by mass, with respect to the total amount of the curable composition.

In addition, the total content of the compound represented by the general formula (S) and the compounds (a) to (g) in the entire water-soluble organic solvent in the curable composition is preferably 3% by mass or more, more preferably 4% by mass or more, and even more preferably 5% by mass or more. By setting the content within this range, it is possible to inhibit curling while not causing the stability or ejecting property of an ink to deteriorate, for example, in the case where the curable composition is used as an ink composition.

[Sensitizer]

The curable composition of the present invention may include a sensitizer such as a sensitized dye in addition to the components described above, and including a sensitizer is preferable. An ordinary sensitized dye can be used and a sensitized dye is not particularly limited, however, with consideration of characteristics of the curable composition of the present invention, a sensitized dye which has excellent solubility in water or the water-soluble organic solvent is preferred. Specifically, a sensitized dye in which 0.5% by mass or more dissolves is preferred, a sensitized dye in which 1% by mass or more dissolves is more preferred, and a sensitized dye in which 3% by mass or more dissolves is particularly preferred, with respect to distilled water at room temperature. In addition, as a sensitized dye, a polymerization initiator in which a water-insoluble polymerization initiator is dispersed in a water-soluble medium or the like can also be used.

Examples of the sensitized dye which can be used in combination in the curable composition of the present invention include N-[2-hydroxy-3-(3,4-dimethyl-9-oxo-9H-thioxanthen-2-yloxy)propyl]-N,N,N-trimethyl aluminum chloride, benzophenone, thioxanthone, an anthraquinone derivative, a 3-acyl coumarin derivative, terphenyl, styryl ketone, 3-(aroylmethylene)thiazoline, camphorquinone, eosin, rhodamine, erythrosine, and a modified substance and a dispersion formed by making these water-soluble. In addition, the sensitized dye described in JP2010-24276A or the sensitized dye described in JP1994-107718A (JP-H06-107718A) can also be suitably used in the present invention.

[Resin Particles]

The curable composition of the present invention may include resin particles, as necessary. As the resin particles, an acrylic-based resin, a vinyl acetate-based resin, a styrene-butadiene-based resin, a vinyl chloride-based resin, an acrylic-styrene-based resin, a butadiene-based resin, a styrene-based resin, a crosslinked acrylic resin, a crosslinked styrene-based resin, a benzoguanamine resin, a phenol resin, a silicone resin, an epoxy resin, a urethane-based resin, a paraffin-based resin, a fluorine-based resin, and the like, or latexes thereof can be used. Among these, the acrylic-based resin, the acrylic-styrene-based resin, the styrene-based resin, the crosslinked acrylic resin, and the crosslinked styrene-based resin are preferred.

The weight average molecular weight of the resin particles is preferably from 10,000 to 200,000 and more preferably from 100,000 to 200,000. The weight average molecular weight can be measured in the same manner as the case of the water-insoluble polymeric dispersant as described above.

The volume average particle diameter of the resin particles is preferably from 10 nm to 1 μm, more preferably from 15 nm to 200 nm, and particularly preferably from 20 nm to 50 nm. The particle diameter distribution of the resin particles is not particularly limited and it may be any one having a wide particle diameter distribution or having a monodispersed particle diameter distribution.

In addition, two or more kinds of resin particles having a monodispersed particle diameter distribution may be mixed and used. The volume average particle diameter and the particle diameter distribution can be measured in the same manner as the case of the colored particle dispersion as described above.

In addition, the glass transition temperature (Tg) of the resin particles is preferably 30° C. or higher, more preferably 40° C. or higher, and particularly preferably 50° C. or higher. Moreover, the measured Tg obtained by an actual measurement is applied to the glass transition temperature in the present invention. Specifically, the measured Tg means the value which is measured under normal measurement conditions by using a differential scanning calorimeter, (DSC) EXSTAR 6220 manufactured by SII Nano Technology Inc.

The content of the resin particles described above is preferably from 0% by mass to 20% by mass, more preferably from 0% by mass to 10% by mass, and particularly preferably from 0% by mass to 5% by mass, with respect to the total amount of the curable composition.

[Surfactant]

The curable composition of the present invention may include a surfactant as a surface tension adjusting agent, as necessary. As a surfactant, any of an anionic surfactant, a cationic surfactant, an amphoteric surfactant, a nonionic surfactant, and a betaine-based surfactant can be used. In addition, the dispersant (polymeric dispersant) described above may be used as a surfactant. Among these, in the curable composition of the present invention, the nonionic surfactant is preferably used, and an acetylene glycol derivative is particularly preferred.

The content of the surfactant in the curable composition is not particularly limited, but for example, in the case where the curable composition of the present invention is used as an ink composition, it is preferable that the content be appropriately adjusted so that an appropriate surface tension is obtained, in consideration of applications of an ink, or the like.

For example, in the case where the curable composition of the present invention is used particularly as an ink for ink jet recording, from the viewpoint of favorably performing the ejection of the ink composition, the surface tension of the ink composition is set preferably to 20 mN/m to 60 mN/m, more preferably to 20 mN/m to 45 mN/m, and particularly preferably to 25 mN/m to 40 mN/m. In this case, the content of the surfactant in the ink composition is preferably adjusted so that the surface tension is set to within the above-described range. Specifically, the content is preferably 1% by mass or more, more preferably from 1% by mass to 10% by mass, and particularly preferably from 1% by mass to 3% by mass, with respect to the curable composition, in particular, the ink composition.

[Other Components]

The curable composition of the present invention may include other components in addition to each of the components described above. Examples of the other components include various kinds of known additives such as an ultraviolet absorbing agent, an anti-fading agent, a fungicide, a pH adjusting agent, an anti-rust agent, an antioxidant, an emulsion stabilizer, a preservative, an antifoaming agent, a viscosity-adjusting agent, a dispersion stabilizer, a chelating agent, and a solid wetting agent.

Examples of the ultraviolet absorber include a benzophenone-based ultraviolet absorber, a benzotriazole-based ultraviolet absorber, a salicylate-based ultraviolet absorber, a cyanoacrylate-based ultraviolet absorber, and a nickel complex salt-based ultraviolet absorber.

Examples of the anti-fading agent which can be used include various kinds of organic-based and metal complex-based anti-fading agents. Examples of the organic-based anti-fading agent include hydroquinones, alkoxyphenols, dialkoxyphenols, phenols, anilines, amines, indanes, coumarones, alkoxyanilines, and heterocycles. Examples of the metal complex-based anti-fading agent include a nickel complex and a zinc complex.

Examples of the fungicide include sodium dehydroacetate, sodium benzoate, sodium pyridinethione-1-oxide, p-hydroxybenzoic acid ethyl ester, 1,2-benzisothiazolin-3-one, sodium sorbate, and sodium pentachlorophenol. The fungicide is preferably included in a range of 0.02% by mass to 1.00% by mass in the curable composition.

The pH adjusting agent is not particularly limited as long as the pH adjusting agent is a compound which can adjust the pH to a desired value without any harmful effects to the curable composition to be formulated. Examples thereof include alcoholamines (for example, diethanolamine, triethanolamine and 2-amino-2-ethyl-1,3-propanediol), alkali metal hydroxides (for example, lithium hydroxide, sodium hydroxide, and potassium hydroxide), ammonium hydroxide (for example, ammonium hydroxide and quaternary ammonium hydroxide), phosphonium hydroxide, and alkali metal carbonates.

Examples of the anti-rust agent include acid sulfite, sodium thiosulfate, ammonium thiodiglycolate, diisopropylammonium nitrite, pentaerythritol tetrahydrochloride, and dicyclohexylammonium nitrate.

Examples of the antioxidant include a phenolic-based antioxidant (including a hindered phenol-based antioxidant), an amine-based antioxidant, a sulfur-based antioxidant, and a phosphorus-based antioxidant.

Examples of the chelating agent include sodium ethylenediamine tetraacetate, sodium nitrilotriacetate, sodium hydroxyethylethylene diamine triacetate, sodium diethylenetriamine pentaacetate, and sodium lauryl diacetate.

<<Application of Curable Composition>>

The curable composition of the present invention can be used in various materials.

The curable composition can be used in paints, adhesives, adhesive agents, inks, functional coatings, various membranes, various films, optical materials, printing plate materials, semiconductor materials, recording materials, tissue culture dishes, paper additives, medical materials, plastics, water-retaining agents, water absorbers, hydrophilic members, or the like, for example.

More specifically, the curable composition can be applied in antireflection layers of various films, subbing adhesive layers of various films, coating layers of various films, resists, printing plates, color filters, endoscope coatings, ion exchange membranes, reverse osmosis membranes, conductive coated films, medical adhesives, proton conductive membranes, microporous membranes, water-absorbing gel, cosmetic gel, medical gel, ionic gels, dental materials, or the like.

Application examples of the curable composition of the present invention are as shown below, but the applications of the curable composition of the present invention are not limited thereto:

UV curable ink jet inks described in JP2002-241654A, JP2010-106085A, or the like; UV curable inks described in JP1998-17605 (JP-H10-17605A), JP2002-285062A, or the like; coatings for optical fibers described in JP2012-136426A, JP2006-208663A, or the like; dental curing-adhesives described in JP2010-235458A, JP2013-56839A, or the like; medical adhesives or medical adhesive agents described in JP2011-26551A, JP2009-247437A, or the like; black resists described in JP2012-27448A, JP2010-204363A, or the like; color resists described in JP2013-53224A, JP2011-95732A, or the like; dry film resists such as JP2009-48170A, JP2004-206433A, or the like; buffer coating films described in JP2011-116968A, JP1994-102667 (JP-H06-102667A), or the like; resist underlayer film materials described in JP2013-83947A, JP2012-203393A, or the like; nano-imprint materials described in JP2013-62489A, JP2012-214022A, or the like; self-repairing paints described in JP2013-49839A, JP2011-5766A, or the like; glazings described in JP2012-229331A, JP2011-74135A, or the like; coatings for headlights described in JP2011-241356A, JP2002-212507A, or the like; binder resins for radiative heat-shielding films described in JP2012-128231A, JP1998-100310 (JP-H10-100310A), or the like; coating agents for dry materials described in JP2011-213002A, JP2011-88995A, or the like; adhesives for drying materials described in JP2010-215808A, JP2009-84347A; hard coating agents for cosmetic containers described in JP2008-303310A, JP2006-1984A, or the like; hard coating agents for optical discs described in JP2011-192342A, JP2011-126991A, or the like; intermediate layer adhesives for optical discs described in JP2011-198434A, JP2011-1652381A, or the like; coating agents for mobiles or light electrical equipment described in JP2011-225846A, JP2011-511031A, or the like; transparent conductive films for touch panel (resistive film type, electrostatic capacity) hard coating agents described in JP2013-75955A, JP2012-197383A, or the like; overcoat films for silver-based transparent conductive films described in JP2013-65305A, JP2013-22843A, or the like; hard coat film adhesives described in JP2013-40256A, JP2013-32500A, or the like; sealing materials for multi-organic EL or electronic paper described in JP2012-828A, JP2010-278157A, or the like; binder resins of anti-reflection films for LCD described in JP2013-83795A, JP2013-33098A, or the like; diffusion films described in JP2012-98526A, JP2012-78799A, or the like; release films described in JP2012-250353A, JP2011-178002A, or the like; hard coated films described in JP2013-64821A, JP2013-50641A, or the like; cured layers of backsheets for solar cells described in JP2012-227382A, JP2012-218209A, or the like; electrolytes for LiB described in JP2008-285668A, JP2004-342537A, or the like; coating agents for kitchenware described in JP2011-94125A, JP2004-211025A, or the like; Hybrid hard coating materials used in various products described in JP2005-336255A, JP1999-194491 (JP-H11-194491A), or the like; fingerprint-proof and antifouling coating materials described in JP2012-219116A, JP2010-95707A, or the like; weather-resistant coating materials described in JP2013-35267A, JP2012-167288A, or the like; electromagnetic wave-shielding materials described in JP2011-124536A, JP2010-147431A, or the like; water-absorbing gels described in JP2008-538375A, JP1997-77832A (JP-H09-77832A), or the like; cosmetic gels described in JP2013-053090A, JP2011-241172A, or the like; medical gels described in JP2011-197196A, WO03/083475A, or the like; ionic gels described in JP2001-406A, JP1997-140681 (JP-H09-140681A), or the like; and dental materials described in JP4171600B, JP4664591B, or the like.

Furthermore, for applications as an adhesive agent, for example, a polyfunctional acrylate described in WO10/092995A, WO10/092988A, or the like and the polyfunctional polymerizable compound represented by the general formula (1) of the present invention can be combined to obtain a preferred radiation-curable adhesive composition for an optical member.

Furthermore, for applications as an optical film, for example, a polyfunctional acrylate described in JP2008-165205A, JP2012-150428A and the polyfunctional polymerizable compound represented by the general formula (1) of the present invention can be combined to make a preferred optical film.

Furthermore, for applications as a printing plate material, for example, a polyfunctional acrylate described in JP2009-226946A or the like and the polyfunctional polymerizable compound represented by the general formula (1) of the present invention can be combined to make a preferred resin printing plate precursor for laser engraving.

Furthermore, when used as a solder resist material, for example, a polyfunctional acrylate described in JP2009-217040A or the like and the polyfunctional polymerizable compound represented by the general formula (1) of the present invention can be combined to prepare each photosensitive film, which can be used to perform lamination into a copper-clad plate.

Furthermore, when used as a metal material, for example, a polyfunctional acrylate described in JP2009-263707A or the like and the polyfunctional polymerizable compound represented by the general formula (1) of the present invention can be combined to make a metal material.

Furthermore, for applications as a lens, for example, a polyfunctional acrylate described in JP2011-072341A or the like and the polyfunctional polymerizable compound represented by the general formula (1) of the present invention can be combined to make each lens. Thus, it can be found that the curable composition of the present invention is useful as a medical material (ophthalmic lenses, endoscopes, catheters, infusion tubes, gas transport tubes, stents, sheaths, cuffs, tube connectors, access ports, drainage bags, blood circuits, wound dressings, and drug carriers) described in JP2011-072341A.

Subsequently, a case where the curable composition of the present invention is used as an ink composition will be specifically described below.

[Ink Composition]

In the case where the curable composition of the present invention is used as an ink composition, the curable composition of the present invention includes the polyfunctional polymerizable compound of the component A1 and the polyfunctional polymerizable compound of the component A2, and preferably further includes the polymerization initiator, the monofunctional polymerizable compound as the component C, the coloring material, and the solvent. By including the polymerizable compound represented by the general formula (1), the ink composition of the present invention can be used as a curable ink, and preferably a curable aqueous ink, and further has properties desirable for ink jet recording.

Further, in the case where the curable composition of the present invention is used as an ink composition, the viscosity and the surface tension of the ink composition can be appropriately selected and adjusted depending on an application of the ink composition or an image forming method.

For example, in the case where the curable composition of the present invention is used as an ink composition for ink jet recording, the viscosity of the ink composition is preferably from 1.2 mPa·s to 15.0 mPa·s, more preferably 2 mPa·s or more and less than 13 mPa·s, and particularly preferably 2.5 mPa·s or more and less than 10 mPa·s.

<<Image Forming Method>>

The image forming method of the present invention includes an ink adding step of adding the curable composition of the present invention (in which the curable composition used in the image forming method of the present invention is hereinafter referred to as an "ink composition" or simply an "ink") onto a recording medium, and an irradiating step of irradiating the ink composition added above with an actinic energy ray. In addition, the image forming method of the present invention may include a treatment liquid adding step of adding a treatment liquid including an aggregating agent which can form aggregates by coming into contact with the components of the ink composition onto the recording medium.

[Recording Medium]

The recording medium used in the image forming method of the present invention is not particularly limited, and general printing paper which is mainly composed of cellulose and used in a general offset printing, paper for exclusive use for ink jet, paper for exclusive use for photo, electrophotographic general-use paper, films (resin films, or the like), cloth, glass, metal, pottery, or like can be used.

As a recording medium, above all, so-called coated paper used for general offset printing and the like is preferable. Coated paper is provided with a coating layer by applying a coating material on the surface of high-quality paper, neutral paper or the like mainly composed of cellulose and generally not surface processed. In an ink jet recording using a normal aqueous ink, since the absorption and drying of an ink is relatively slow, coated paper is apt to suffer problems relating to quality such as color consistency, glossiness, and rubfastness; however, according to the image forming method of the present invention, it is possible to obtain an image having excellent color consistency, glossiness, and rubfastness. In particular, it is preferable to use coated paper having a coating layer including a base sheet and an inorganic pigment, and it is more preferable to use coated paper having a coated layer including a base sheet and kaolin and/or calcium bicarbonate. Specifically, art paper, coated paper, lightweight coated paper, or fine coated paper is more preferred.

As the coated paper, it is possible to use ones which are generally commercially available, and examples thereof include art paper (A1) such as "OK Kinfuji+" manufactured by Oji Paper Co., Ltd. and "Tokubishi Art" manufactured by Mitsubishi Paper Mills Ltd.; coated paper (A2, B2) such as "OK Top Coat+" manufactured by Oji Paper Co., Ltd. and "Aurora Coat" manufactured by Nippon Paper Industries Co., Ltd.; matt coated paper such as "U-LITE" manufactured by Nippon Paper Industries Co., Ltd.; lightweight coated paper (A3) such as "OK Coat L" manufactured by Oji Paper Co., Ltd. and "Aurora L" manufactured by Nippon Paper Industries Co., Ltd.; and fine coated paper such as "OK Everlight Coat" manufactured by Oji Paper Co., Ltd. and "Aurora S" manufactured by Nippon Paper Industries Co., Ltd.

[Ink Adding Step]

A method of adding the ink composition of the present invention onto the recording medium is not particularly limited as long as the ink composition can be applied to form the desired image, and various kinds of ink adding methods which are usually used can be used. Examples thereof include a relief method, a plate method, an intaglio method, a mimeograph method, and an ink jet method. Among these, from the viewpoint in which the ink composition of the present invention is particularly suitable as an ink for ink jet recording and of the compactification and the high-speed recordability of a recording device, the ink adding step is preferably carried out by adding the ink composition onto the recording medium by an ink jet method.

<Ink Jet Method>

In an ink jet method, by giving energy to the ink composition, the ink composition is ejected from an ink ejection head, and a colored image is formed on the recording medium.

The ink jet method used in the image forming method of the present invention is not particularly limited and any well-known method such as, for example, a thermal ink jet (bubble jet (registered trademark)) method of heating the ink, forming bubbles, and using the generated pressure, an electric charge control method of using electrostatic attraction to eject ink, a drop-on-demand method (pressure pulse method) of using the vibration pressure of piezo elements, a sound method of ejecting an ink using a sound beam (radiation pressure) which is converted from an electrical signal, and the like can be applied.

In addition, the ink jet method may be an on-demand type or may be a continuous type. Furthermore, the ink nozzles and the like which are used are not particularly limited; however, they can be appropriately selected according to the purpose.

Further, the ink jet method includes a method of ejecting a low concentration ink known as a photo ink in a small volume many times, a method of improving the image quality using a plurality of inks of different concentrations with substantially the same hue, and a method of using a colorless transparent ink.

In addition, as an ink jet method, there is a shuttle type of using a short serial head (short head) and performing recording while causing the serial head to scan in the width direction of the recording medium and a line type of using a line head in which recording elements are arranged corresponding to the entire range of one side of the recording medium. In the line type, it is possible to perform image recording over the whole surface of the recording medium by scanning the recording medium in the direction perpendicular to the arrangement direction of the recording elements and a transport system for a carriage or the like scanning the short head is unnecessary. In addition, since complicated scanning control of the movement of the carriage and the recording medium is unnecessary and only the recording medium is moved, it is possible to realize an increase in the recording speed in comparison with the shuttle type.

More specifically, in the image forming method of the present invention, an ink jet method described in paragraphs Nos. 0093 to 0105 of JP2003-306623A can preferably be applied.

[Treatment Liquid Adding Step]

The image forming method of the present invention preferably includes a treatment liquid adding step of adding a treatment liquid including an aggregating agent which can form aggregates by coming into contact with the components of the ink composition onto the recording medium. The treatment liquid adding step may be arranged either before or after the ink adding step. In the image forming method of the present invention, an embodiment in which the ink adding step is arranged after the treatment liquid adding step is preferred.

Specifically, an embodiment in which before adding the ink composition, the treatment liquid for aggregating the coloring material (pigments or the like) and/or the polymer particles in the ink composition is applied onto the recording medium in advance and the ink composition is applied so as to come into contact with the treatment liquid added onto the recording medium is preferable. By performing these steps, it is possible to increase the speed of the image recording, and an image which has high density and high-resolution even with high-speed recording can be obtained.

Examples of the treatment liquid include a liquid composition which can generate aggregates by changing the pH of the ink composition. At this time, the pH (25° C.) of the treatment liquid is preferably from 0 to 6, more preferably from 0.3 to 3, and even more preferably from 0.5 to 2, from the viewpoint of the rate of aggregation of the ink composition. In this case, the pH (25° C.) of the used ink composition is preferably from 7.5 to 9.5, and more preferably from 8.0 to 9.0.

Among them, in the present invention, a case where the pH (25° C.) of the ink composition is 7.5 or more and the pH (25° C.) of the treatment liquid is from 0.5 to 2 is preferred, from the viewpoint of the image density, the resolution and an increase in the speed of an ink jet recording.

The treatment liquid which can be used in the present invention is a composition which can form aggregates when coming into contact with the ink composition. Specifically, when the treatment liquid and the ink composition are mixed, the treatment liquid can be configured by including at least one kind of an aggregating component which is capable of forming aggregates by aggregating the dispersion particles such as the coloring material (the pigment, the colored particles, or the like as described above) in the ink composition and by including other components, as necessary. By mixing the treatment liquid including an aggregating component which is capable of forming aggregates by coming into contact with the ink composition and the ink composition, the aggregation of a pigment, or the like which is stably dispersed in the ink composition is promoted.

The treatment liquid preferably includes at least one kind of an acid compound, as an aggregating component. As an acid compound, a compound having a phosphoric acid group, a phosphonic acid group, a phosphinic acid group, a sulfate group, a sulfonic acid group, a sulfinic acid group, or a carboxyl group, or a salt thereof (for example, a multivalent metal salt) can be used. Among these, from the viewpoint of the rate of aggregation of the ink composition, a compound having a phosphoric acid group or a carboxyl group is more preferred, and a compound having a carboxyl group is even more preferred.

As a compound having a carboxyl group, it is preferable to select from polyacrylic acid, acetic acid, glycolic acid, malonic acid, malic acid, maleic acid, ascorbic acid, succinic acid, glutaric acid, fumaric acid, citric acid, tartaric acid, lactic acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, a derivative thereof, a salt thereof (for example, a multivalent metal salt), and the like. The compound having a carboxyl group may be used singly or in combination of two or more kinds thereof.

The aggregating component can be used singly or as a mixture of two or more kinds thereof. The content of an acidic compound in the treatment liquid is preferably from 5% by mass to 95% by mass, and more preferably from 10% by mass to 80% by mass, with respect to the total mass of the treatment liquid, from the viewpoint of the aggregating effect.

The treatment liquid can be configured by further including an aqueous solvent (for example, water, a water-soluble organic solvent, or the like), in addition to the acidic compound. In addition, the treatment liquid may be configured by appropriately including various kinds of additives such as a surfactant.

In addition, a preferred example of the treatment liquid for enhancing high-speed aggregability may be a treatment liquid in which a multivalent metal salt or polyallylamine is also included. Examples of the multivalent metal salt include alkaline-earth metals of group 2 in the periodic table (for example, magnesium, calcium), transition metals of group 3 in the periodic table (for example, lanthanum), cations from group 13 in the periodic table (for example, aluminum), salts of lanthanides (for example, neodymium), polyallylamine, and polyallylamine derivatives. As a metal salt, a carboxylate (a salt of formic acid, acetic acid, benzoate acid, or the like), a nitrate, a chloride, and thiocyanate are preferred. Among these, a calcium salt or a magnesium salt of a carboxylic acid (a salt of formic acid, acetic acid, benzoate acid, or the like), a calcium salt or a magnesium salt of nitric acid, calcium chloride, magnesium chloride, and a calcium salt or a magnesium salt of thiocyanic acid are preferred.

The content of a metal salt in the treatment liquid is preferably from 1% by mass to 10% by mass, more preferably from 1.5% by mass to 7% by mass, and even more preferably from 2% by mass to 6% by mass.

The viscosity of the treatment liquid is preferably from 1 mPa·s to 30 mPa·s, more preferably from 1 mPa·s to 20 mPa·s, even more preferably from 1 mPa·s to 15 mPa·s, and particularly preferably from 1 mPa·s to 10 mPa·s, from the viewpoint of the rate of aggregation of the ink composition. Moreover, the viscosity is measured under the conditions of 20° C. by using VISCOMETER TV-22 (manufactured by Toki Sangyo Co., Ltd.).

In addition, the surface tension of the treatment liquid is preferably from 20 mN/m to 60 mN/m, more preferably from 20 mN/m to 45 mN/m, and even more preferably from 25 mN/m to 40 mN/m, from the viewpoint of the rate of aggregation of the ink composition. Moreover, the surface tension is measured under the conditions of 25° C. by using Automatic Surface Tensiometer CBVP-Z (manufactured by Kyowa Interface Science Co., LTD.)

The addition of the treatment liquid can be carried out by applying a well-known method such as a coating method, an ink jet method, or a dipping method. As the coating method, it is possible to perform well-known coating methods using a bar coater, an extrusion die coater, an air doctor coater, a blade coater, a rod coater, a knife coater, a squeeze coater, a reverse roll coater, or the like. The details of the ink jet method are as previously described.

The addition amount of the treatment liquid is not particularly limited as long as it is possible to aggregate the ink composition; however, preferably, it is possible to set the amount to one at which the addition amount of the aggregating agent becomes $0.5 \text{ g/m}^2$ to $4.0 \text{ g/m}^2$. Above all, an amount at which the addition amount of the aggregating agent becomes $0.9 \text{ g/m}^2$ to $3.75 \text{ g/m}^2$ is preferred. When the addition amount of the aggregating agent is $0.5 \text{ g/m}^2$ or more, it is possible to maintain favorable high-speed aggregability according to the various types of usage patterns of the ink composition. In addition, it is preferable that the added amount of the aggregating agent be $4.0 \text{ g/m}^2$ or less, from the viewpoint that there is no adverse influence (change in the gloss, or the like) on the surface property of the applied recording medium.

[Heating and Drying Step]

In the image forming method of the present invention, it is preferable that the ink adding step is provided after the treatment liquid adding step, and a heating and drying step of heating and drying the treatment liquid on the recording medium is further provided in the time after the treatment liquid is added onto the recording medium and before the ink composition is applied. By heating and drying the treatment liquid in advance before the ink adding step, the ink colorability such as bleeding prevention becomes favorable and it is possible to record a visible image with a favorable color consistency and hue.

The heating and drying can be carried out by well-known heating means such as a heater, air blowing means for using blown air such as a dryer, or means for combining these. Examples of the heating method include a method of applying heat with a heater or the like from the opposite side to the side of adding the treatment liquid to the recording medium, a method of blowing warm air or hot air onto the side of adding the treatment liquid to the recording medium, a heating method of using an infrared heater and the like are included, and heating may be carried out using a combination of a plurality of these.

[Actinic Energy Ray Irradiating Step]

After the ink adding step, the ink composition applied onto the recording medium is irradiated with an actinic energy ray. By radiating an actinic energy ray, the polymerizable compound in the ink composition is cured, the cured film including the coloring material is formed, and thus it is possible to fix an image.

In the image forming method of the present invention, as an actinic energy ray, an a ray, a γ ray, an electron beam, an X ray, an ultraviolet ray, visible light, an infrared ray, and the like can be used. Out of these actinic energy rays, an ultraviolet ray, visible light and infrared ray are preferred, and an ultraviolet (UV) ray is more preferred, from the viewpoint of safety, or the like. The wavelength of the actinic energy ray is, for example, preferably from 200 nm to 600 nm, more preferably from 250 nm to 450 nm, and particularly preferably from 250 to 400 nm.

The output of the actinic energy ray is preferably 5000 mJ/cm$^2$ or less, more preferably from 10 mJ/cm$^2$ to 4000 mJ/cm$^2$, and particularly preferably from 20 mJ/cm$^2$ to 3000 mJ/cm$^2$.

Examples of a device which can radiate an actinic energy ray include an exposure device in which a LED lamp, a mercury lamp such as a high-pressure mercury lamp, an extra-high pressure mercury lamp, a Deep UV lamp, and a low-pressure UV lamp, an excimer lamp such as a halide lamp, a xenon flash lamp, a metal halide lamp, an ArF excimer lamp, and a KrF excimer lamp, an extreme ultraviolet light lamp, an electron beam, or an X ray lamp are set to the light source. The irradiation with ultraviolet rays can be carried out by using a normal ultraviolet ray irradiating device, for example, a commercially available ultraviolet ray irradiating device for curing/adhering/exposing (SP9-250UB, manufactured by USHIO Inc., or the like).

In addition, a light-emitting diode (LED) and a laser diode (LD) can also be used as a source of an actinic energy ray. The LED (UV-LED) and the LD (UV-LD) are small-size, long-life, have high efficiency, and low cost, and can be expected to fulfill a roll as a light source for photo curable type ink jet. Particularly, in the case where an ultraviolet light source is required, an ultraviolet LED and an ultraviolet LD can be used. For example, NICHIA Corporation markets an ultraviolet LED having a wavelength in which a main emission spectrum has wavelengths between 365 nm and 420 nm.

An actinic energy ray source used for the image forming method of the present invention is preferably a mercury lamp or a metal halide lamp.

[Ink Drying Step]

In the image forming method of the present invention, an ink drying step of removing an ink solvent (for example, water, an organic solvent, or the like) in the ink composition applied onto the recording medium by drying may be provided, as necessary.

The ink drying step only has to be carried out after the ink adding step and may be before or after the actinic energy ray irradiating step, but the ink drying step is preferably carried out before the actinic energy ray irradiating step.

In the ink drying method, at least a part of an ink solvent only has to be removed, and methods which are usually used can be applied. For example, heating by using a heater or the like, air blowing by using a dryer or the like, or methods of combining these can be carried out.

EXAMPLES

Hereinafter, the present invention will be described in more detail on the basis of Examples, but the present invention is not limited to Examples thereof. Further, unless otherwise specified, "part(s)" and "%" are on the basis of mass.

Example 1

The polyfunctional polymerizable compound A1 represented by the general formula (1) and another polyfunctional polymerizable compound were synthesized as follows.

(Synthesis of Polyfunctional Polymerizable Compound A1)

—Synthesis of Polymerizable Compound 1—

According to the following scheme, a polymerizable compound 1 was synthesized.

[Chem. 15]

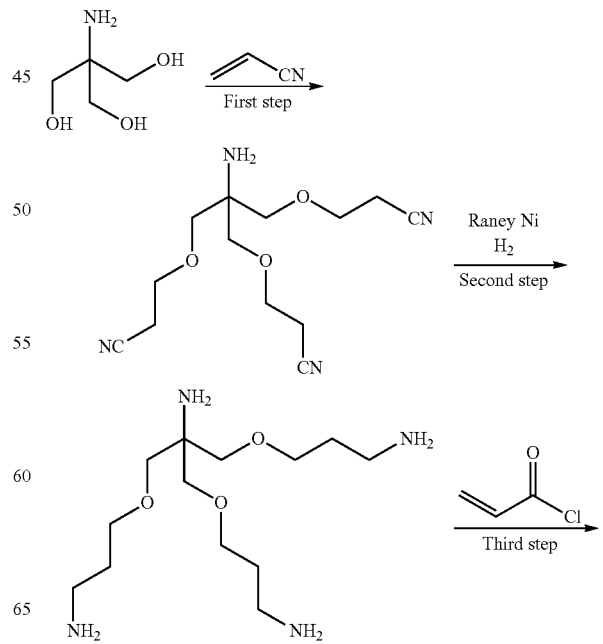

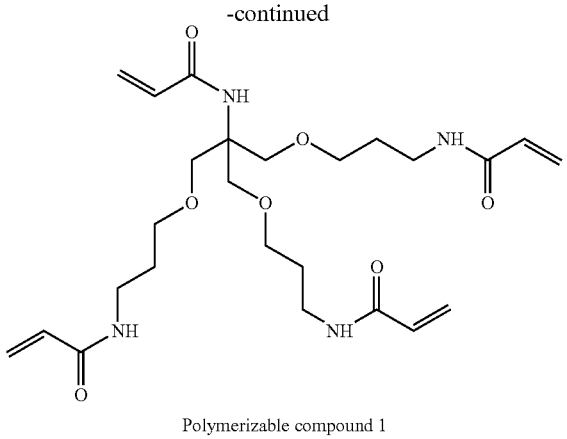

Polymerizable compound 1

(First Step)

121 g (1 equivalent) of tris(hydroxymethyl)aminomethane (manufactured by Tokyo Chemical Industry Co., Ltd.), 84 ml of a 50% potassium hydroxide aqueous solution, and 423 ml of toluene were put into a three-necked flask with a volume of 1 L, equipped with a stirrer bar, followed by stirring, while maintaining the reaction system at 20° C. to 25° C. in a water bath, and 397.5 g (7.5 equivalents) of acrylonitrile was added dropwise thereto over 2 hours. After the dropwise addition, the mixture was stirred for 1.5 hours, then 540 ml of toluene was added into the reaction system, the reaction mixture was transferred to a separatory funnel, and the aqueous layer was removed. After drying the remaining organic layer using magnesium sulfate, the residue was filtered over Celite, and the solvent was evaporated under reduced pressure to obtain an acrylonitrile adduct. Since the results of the analysis of the obtained substance by $^1$H-NMR and MS showed a good consistency with known products, the obtained substance was used in the next reduction reaction without further purification.

(Second Step)

24 g of the acrylonitrile adduct obtained above, 48 g of a Ni catalyst (Raney nickel 2400, manufactured by W. R. Grace & Co.), and 600 ml of a 25% aqueous ammonia:methanol=1:1 solution were put into an autoclave with a volume of 1 L, followed by performing suspension, and the reaction vessel was sealed. Hydrogen at 10 MPa was introduced into the reaction vessel, and the reaction was carried out for 16 hours at a reaction temperature of 25° C.

The disappearance of the raw material was confirmed by $^1$H-NMR, the reaction mixture was filtered over Celite, and the Celite was washed several times using methanol. The solvent was evaporated from the filtrate under reduced pressure to obtain a polyamine substance. The obtained substance was used in the next reaction without further purification.

(Third Step)

30 g of the polyamine substance obtained above, 120 g (14 equivalents) of NaHCO$_3$, 1 L of dichloromethane, and 50 ml of water were put into a three-necked flask with a volume of 2 L, equipped with a stirrer, and 92.8 g (10 equivalents) of acrylic acid chloride was added dropwise thereto over 3 hours in an ice bath, followed by stirring at room temperature for 3 hours. After the disappearance of the raw material was confirmed by $^1$H-NMR, the solvent was evaporated from the reaction mixture under reduced pressure. The reaction mixture was dried using magnesium sulfate, the residue was filtered over Celite, and the solvent was evaporated under reduced pressure. Finally, the residue was purified by column chromatography (ethyl acetate/methanol=4:1) to obtain a white solid (yield of 40%) at normal temperature. The yield of the three steps was 40%.

The obtained white solid was identified by $^1$H-NMR under the following measurement conditions. The identification data is shown in FIG. 1.

$^1$H-NMR solvent: Deuterated chloroform, Internal standard: TMS

From the data of $^1$H-NMR shown in FIG. 1, since the integrated ratio of the peak of one hydrogen which was derived from an acrylic group near 5.6 ppm was 4 with respect to 6 of the integrated ratio of the singlet peak (peak derived from the mother skeleton) near 3.75 ppm, it was found that the compound had four acrylic amide groups. From these results, it was confirmed that the white solid had a structure shown by the polymerizable compound 1.

—Synthesis of Polymerizable Compound 2—

In the first step of the synthesis scheme of the polymerizable compound 1, a polymerizable compound 2 (colorless liquid) was synthesized in the same manner as for the Synthesis Example of the polymerizable compound 1 except for adding 74.7 g of methacrylonitrile instead of acrylonitrile. The yield of the three steps was 37%.

Moreover, by identifying the colorless liquid obtained by the synthesis using $^1$H-NMR in the same manner as for the Synthesis Example of the polymerizable compound 1, it was confirmed that the colorless liquid had a structure shown by the polymerizable compound 2.

[Chem. 16]

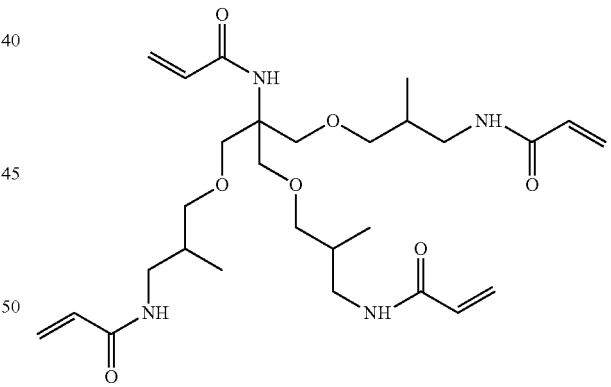

Polymerizable compound 2

—Synthesis of Polymerizable Compound 7—

In the third step of the synthesis scheme of the polymerizable compound 1, a polymerizable compound 7 (colorless liquid) was synthesized in the same manner as for the Synthesis Example of the polymerizable compound 1 except for adding 107.2 g of methacrylic acid chloride instead of acrylic acid chloride. The yield of the three steps was 37%.

Moreover, by identifying the colorless liquid obtained by the synthesis using $^1$H-NMR in the same manner as for the Synthesis Example of the polymerizable compound 1, it was confirmed that the colorless liquid had a structure shown by the polymerizable compound 7.

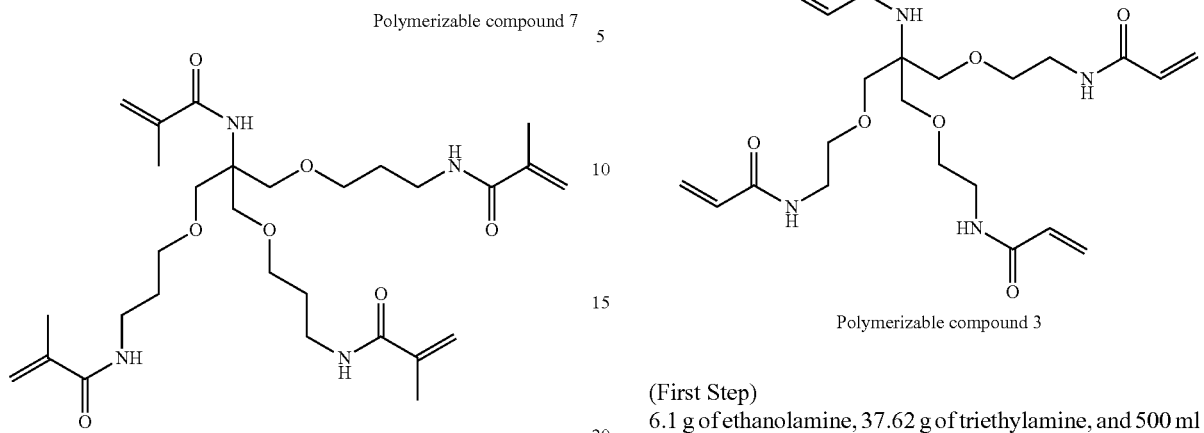

Polymerizable compound 7

—Synthesis of Polymerizable Compound 3—

According to the following scheme, a polymerizable compound 3 was synthesized.

[Chem. 18]

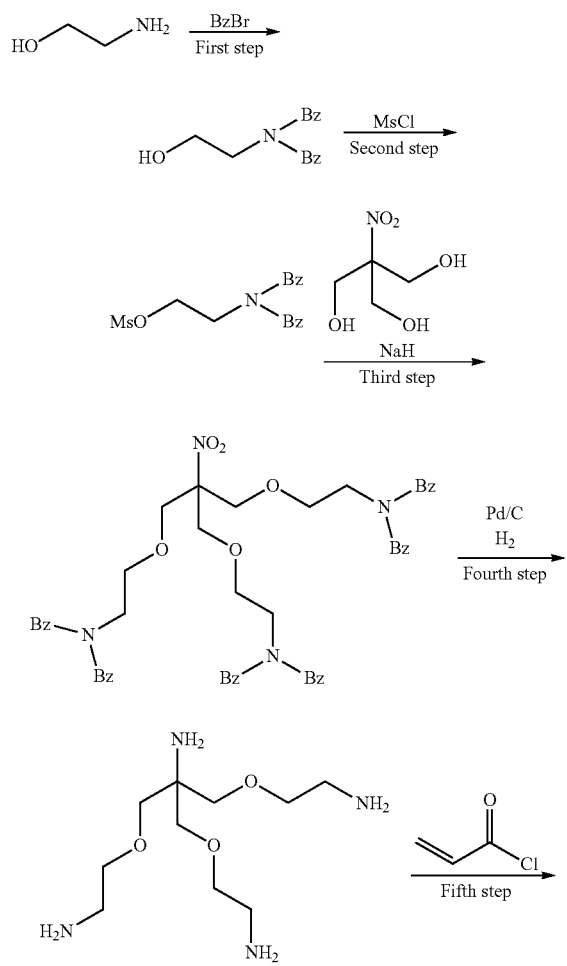

Polymerizable compound 3

(First Step)

6.1 g of ethanolamine, 37.62 g of triethylamine, and 500 ml of tetrahydrofuran were put into a three-necked flask with a volume of 1 L, followed by stiffing in an ice bath. Next, 37.62 g of benzyl bromide was added dropwise thereto by using a dropping funnel while maintaining the inner temperature at 10° C. or lower. After the dropwise addition, the ice bath was removed, followed by stiffing at room temperature for 3 hours. The completion of the reaction was confirmed by TLC, a saturated ammonium chloride aqueous solution was added to the mixture for neutralization, and the reaction liquid was transferred to a separatory funnel. After the aqueous layer and the organic layer were separated, the reaction product was extracted from the separated aqueous layer three times with ethyl acetate. The obtained organic layer was sufficiently dried by adding magnesium sulfate and the residue was filtered over Celite. The filtrate was concentrated under reduced pressure and purified by column chromatography to obtain 22.89 g (yield of 95%) of ethanolamine in which nitrogen was protected with benzyl (a nitrogen-protected ethanolamine).

(Second Step)

12 g of the nitrogen-protected ethanolamine obtained above, 7.54 g of triethylamine, and 500 ml of tetrahydrofuran were put into a three-necked flask with a volume of 1 L, followed by stirring in an ice bath. Next, 6.83 g of methanesulfonyl chloride was added dropwise thereto by using a dropping funnel while maintaining the inner temperature at 10° C. or lower. After the dropwise addition, the ice bath was removed, followed by stirring at room temperature for 2 hours. The completion of the reaction was confirmed by TLC, a saturated ammonium chloride aqueous solution was added to the mixture for neutralization, and the reaction liquid was transferred to a separatory funnel. After the aqueous layer and the organic layer were separated, the reaction product was extracted from the separated aqueous layer three times with ethyl acetate. The obtained organic layer was sufficiently dried by adding magnesium sulfate and the residue was filtered over Celite. The filtrate was concentrated under reduced pressure and purified by column chromatography to obtain 13.48 g (yield of 85%) of ethanolamine in which alcohol was protected with sulfonyl.

(Third Step)

1.5 g of 2-(hydroxymethyl)-2-nitro-1,3-propanediol and 400 ml of N,N-dimethylformamide (DMF) were put into a three-necked flask with a volume of 1 L, followed by stiffing in an ice bath. Next, sodium hydride (60%) was carefully added thereto while maintaining the inner temperature at 15° C. or lower. After the addition, the mixture was stirred at room temperature for 1 hour and further stirred in an ice bath again, and the inner temperature was set to 5° C. Next, a solution in which 10.53 g of the ethanolamine in which the obtained alcohol was protected with sulfonyl was dissolved in 100 ml of DMF was added dropwise thereto by using a dropping funnel while maintaining the inner temperature at 10° C. or lower. After the dropwise addition, the ice bath was removed and the mixture was stirred at room temperature for 16 hours. The completion of the reaction was confirmed by TLC, water was added to the mixture to deactivate the excess base, and the reaction liquid was transferred to a separatory funnel. After the aqueous layer and the organic layer were separated, the reaction product was extracted from the separated aqueous layer three times with ethyl acetate. The obtained organic layer was sufficiently dried by adding magnesium sulfate and the residue was filtered over Celite. The filtrate was concentrated under reduced pressure and purified by column chromatography to obtain 4.9 g (yield of 60%) of an aminoalcohol adduct compound.

(Fourth Step)

20.0 g of the aminoalcohol adduct compound, 5.74 g of a 10%-by-weight Pd/C catalyst (manufactured by Aldrich Co., Ltd.), and 600 ml of methanol were put into an autoclave with a volume of 1 L, followed by stirring. After the inside of an autoclave was purged with nitrogen, hydrogen at 10 MPa was introduced thereto, and the reaction was carried out for 16 hours at 25° C. The obtained reaction liquid was filtered by filtration over Celite and the Ni catalyst was removed. The filtrate was concentrated under reduced pressure to obtain 2.52 g (yield of 100%) of a polyamine compound. The obtained polyamine substance was used in the next reaction without particular purification.

(Fifth Step)

2.52 g of the polyamine substance obtained above, 6.72 g of sodium hydrogen carbonate, 500 mL of tetrahydrofuran, and 50 ml of water were put into a three-necked flask with a volume of 1 L, followed by stirring in an ice bath. Next, 5.43 g of acrylic acid chloride was added dropwise thereto while maintaining the temperature inside the flask at 10° C. or lower. After the dropwise addition, the mixture was stirred at room temperature for 2 hours. After the solid component of the obtained reaction mixture was filtered over Celite, the filtrate was concentrated under reduced pressure. The residue was then purified by silica gel column chromatography (ethyl acetate/methanol=85:15) to obtain 2.46 g (yield of 53%) of a colorless liquid. The yield of the five steps was 26%.

Moreover, by identifying the colorless liquid obtained by the synthesis using $^1$H-NMR in the same manner as for the Synthesis Example of the polymerizable compound 1, it was confirmed that the colorless liquid had a structure shown by the polymerizable compound 3.

(Synthesis of Polyfunctional Polymerizable Compound A2)

As a polyfunctional polymerizable compound A2, the following polyfunctional compounds 1 to 11 were used.

The polyfunctional compound 1 was a trade name A-GLY-9E ethoxylate glycerin triacrylate (EO; ethylene oxide 9 mol) manufactured by Shin-Nakamura Chemical Co., Ltd.; the polyfunctional compound 2 was manufactured by Aldrich Co., Ltd.; the polyfunctional compounds 3 and 4 were both manufactured by Tokyo Chemical Industry Co., Ltd.; and the polyfunctional compound 5 was a trade name NEOALLYL (R) P-30 pentaerythritol triallyl ether manufactured by Daiso Co., Ltd. Furthermore, the polyfunctional compounds 6 to 11 were synthesized with reference to the acylation reaction conditions described in JP2012-206992A, using commercially available amines in the related art as a raw material. The sources of the raw material amines are shown below.

Raw material amine of polyfunctional compound 6 . . . 1,2-Diaminopropane (manufactured by Tokyo Chemical Industry Co., Ltd.)

Raw material amine of polyfunctional compound 7 . . . 1,3-Diaminopropane (manufactured by Tokyo Chemical Industry Co., Ltd.)

Raw material amine of polyfunctional compound 8 . . . Diethylene glycol bis(3-aminopropyl) ether (manufactured by Tokyo Chemical Industry Co., Ltd.)

Raw material amine of polyfunctional compound 9 . . . Diethylenetriamine (manufactured by Tokyo Chemical Industry Co., Ltd.)

Raw material amine of polyfunctional compound 10 . . . Triethylenetetramine (manufactured by Aldrich Co., Ltd.)

Raw material amine of polyfunctional compound 11 . . . Tris(2-aminoethyl)amine (manufactured by Tokyo Chemical Industry Co., Ltd.)

The specific synthesis methods are shown below.

—Synthesis of Polyfunctional Compound 6—

30 g of 1,2-diaminopropane (manufactured by Tokyo Chemical Industry Co., Ltd.) as a raw material amine, 204 g of NaHCO$_3$, 1 L of dichloromethane, and 200 ml of water were put into a three-necked flask with a volume of 2 L, equipped with a stirrer, and 146.6 g of acrylic acid chloride was added dropwise thereto over 3 hours in an ice bath, followed by stirring at room temperature for 1 hour. After the disappearance of the raw material was confirmed by $^1$H-NMR, the aqueous layer was removed by a liquid separation treatment. The remaining organic phase was dried over magnesium sulfate, magnesium sulfate was filtered off over Celite and the solvent was evaporated under reduced pressure. Finally, the residue was purified by column chromatography (ethyl acetate/methanol=4:1) to obtain a white solid (yield of 45%) at normal temperature.

—Synthesis of Polyfunctional Compound 7—

30 g of 1,3-diaminopropane (manufactured by Tokyo Chemical Industry Co., Ltd.) as a raw material amine, 204 g of NaHCO$_3$, 1 L of dichloromethane, and 200 ml of water were put into a three-necked flask with a volume of 2 L, equipped with a stirrer, and 146.6 g of acrylic acid chloride was added dropwise thereto over 3 hours in an ice bath, followed by stirring at room temperature for 1 hour. After the disappearance of the raw material was confirmed by $^1$H-NMR, the aqueous phase was removed by a liquid separation treatment. The remaining organic layer was dried over magnesium sulfate, magnesium sulfate was filtered off over Celite and the solvent was evaporated under reduced pressure. Finally, the residue was purified by column chromatography (ethyl acetate/methanol=4:1) to obtain a white solid (yield of 35%) at normal temperature.

—Synthesis of Polyfunctional Compound 8—

30 g of diethylene glycol bis(3-aminopropyl) ether (manufactured by Tokyo Chemical Industry Co., Ltd.) as a raw material amine, 68.6 g of NaHCO$_3$, 1 L of dichloromethane, and 200 ml of water were put into a three-necked flask with a volume of 2 L, equipped with a stirrer, and 49.2 g of acrylic acid chloride was added dropwise thereto over 3 hours in an ice bath, followed by stirring at room temperature for 1 hour. After the disappearance of the raw material was confirmed by $^1$H-NMR, the aqueous layer was removed by a liquid separation treatment. The remaining organic layer was dried over magnesium sulfate, magnesium sulfate was filtered off over Celite and the solvent was evaporated under reduced pressure. Finally, the residue was purified by column chromatography (ethyl acetate/methanol=4:1) to obtain a white solid (yield of 44%) at normal temperature.

—Synthesis of Polyfunctional Compound 9—

30 g of diethylenetriamine (manufactured by Tokyo Chemical Industry Co., Ltd.) as a raw material amine, 220.1 g of NaHCO$_3$, 1 L of dichloromethane, and 200 ml of water were put into a three-necked flask with a volume of 2 L, equipped with a stirrer, and 157.5 g of acrylic acid chloride was added dropwise thereto over 3 hours in an ice bath, followed by stirring at room temperature for 1 hour. After the disappearance of the raw material was confirmed by $^1$H-NMR, the aqueous layer was removed by a liquid separation treatment. The remaining organic layer was dried over magnesium sulfate, magnesium sulfate was filtered off over Celite, and the solvent was evaporated under reduced pressure. Finally, the residue was purified by column chromatography (ethyl acetate/methanol=4:1) to obtain a white solid (yield of 54%) at normal temperature.

—Synthesis of Polyfunctional Compound 10—

30 g of triethylenetetramine (manufactured by Aldrich Co., Ltd.) as a raw material amine, 206.6 g of NaHCO$_3$, 1 L of dichloromethane, and 200 ml of water were put into a three-necked flask with a volume of 2 L, equipped with a stirrer, and 148.4 g of acrylic acid chloride was added dropwise thereto over 3 hours in an ice bath, followed by stirring at room temperature for 1 hour. After the disappearance of the raw material was confirmed by $^1$H-NMR, the aqueous layer was removed by a liquid separation treatment. The remaining organic layer was dried over magnesium sulfate, magnesium sulfate was filtered off over Celite and the solvent was evaporated under reduced pressure. Finally, the residue was purified by column chromatography (ethyl acetate/methanol=4:1) to obtain a white solid (yield of 44%) at normal temperature.

—Synthesis of Polyfunctional Compound 11—

30 g of tris(2-aminoethyl)amine (manufactured by Tokyo Chemical Industry Co., Ltd.) as a raw material amine, 155.4 g of NaHCO$_3$, 1 L of dichloromethane, and 200 ml of water were put into a three-necked flask with a volume of 2 L, equipped with a stirrer, and 111.3 g of acrylic acid chloride was added dropwise thereto over 3 hours in an ice bath, followed by stirring at room temperature for 1 hour. After the disappearance of the raw material was confirmed by $^1$H-NMR, the aqueous layer was removed by a liquid separation treatment. The remaining organic layer was dried over magnesium sulfate, magnesium sulfate was filtered off over Celite, and the solvent was evaporated under reduced pressure. Finally, the residue was purified by column chromatography (ethyl acetate/methanol=4:1) to obtain a white solid (yield of 30%) at normal temperature.

Each of the white solids obtained above were analyzed by $^1$H-NMR and it was found that polyfunctional compounds 6 to 11 were obtained.

[Chem. 19]

Polyfunctional compound 1

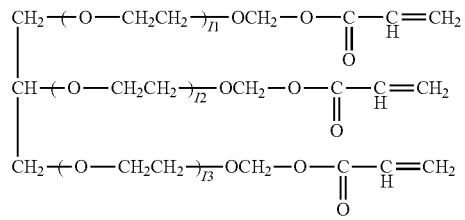

l1 + l2 + l3 = 6

Polyfunctional compound 2

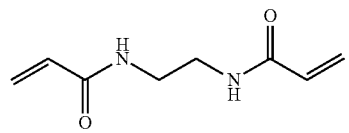

Polyfunctional compound 3

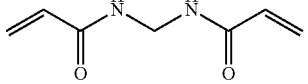

Polyfunctional compound 4

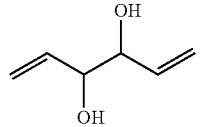

Polyfunctional compound 5

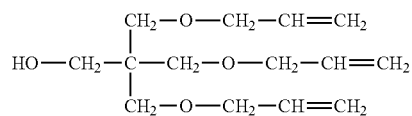

Polyfunctional compound 6

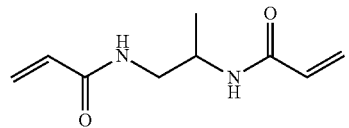

Polyfunctional compound 7

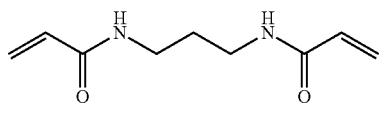

Polyfunctional compound 8

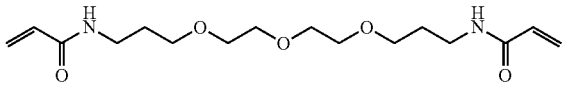

Polyfunctional compound 9

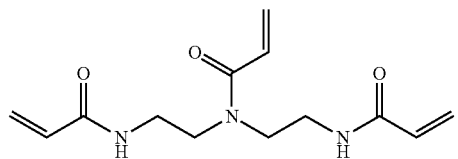

Polyfunctional compound 10

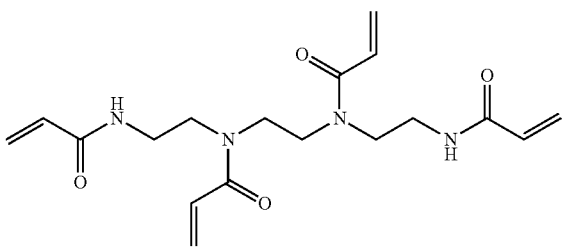

Polyfunctional compound 11

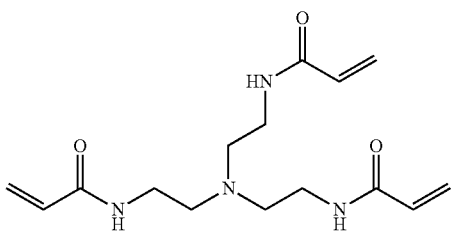

(Synthesis of Other Polyfunctional Polymerizable Compounds)
—Synthesis of Polymerizable Compounds a and b—
Polymerizable compounds a and b were both synthesized by the method described in JP2005-307198A.

[Chem. 20]

Polymerizable compound a

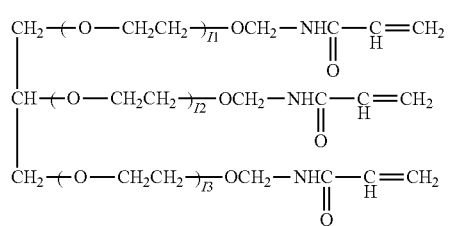

$l1 + l2 + l3 = 6$

Polymerizable compound b

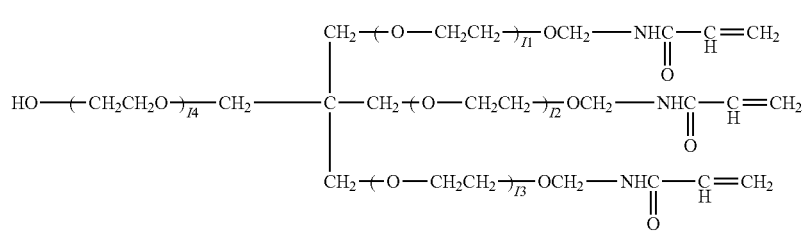

$l1 + l2 + l3 + l4 = 6$

Using these, the curability and the storage stability were evaluated as follows.

[Evaluation of Curing Property]

For the evaluation of curability, a polyfunctional polymerizable compound (A), in which the polyfunctional polymerizable compound (A1) represented by the general formula (1) and the polyfunctional polymerizable compound (A2) had been mixed at a ratio described in Table 1 below to a total amount to 250 mg, and 25 mg of a photopolymerization radical initiator Irg-2959 (manufactured by Ciba Specialty Chemicals Co., Ltd.; 1-(4-(2-hydroxyethoxyl)phenyl)-2-hydroxy-2-methoxy-1-propan-1-one) were dissolved in 1 ml of methanol/water (mass mixing ratio 1/1) (solvent composition 1), and adjusted to pH 8 to 9 with sodium hydroxide, thereby preparing each of sample liquids for evaluation (hereinafter also simply referred to as a "sample liquid"). Similarly, a sample liquid dissolved in 1 ml of methanol (solvent composition 2) was also prepared. Next, 10 μl of this sample liquid for evaluation was applied onto a copper plate.

The copper plate having the sample liquid added thereonto was analyzed by FT-IR, and the peaks at a region of 800 to 900 $cm^{-1}$, derived from a (meth)acryl group, a vinyl group, and an allyl group, were confirmed. Thereafter, the copper plate having the sample liquid added thereonto (hereinafter also referred to as the "sample plate") was exposed by an ultraviolet rays exposure machine at 600 $mJ/cm^2$ for 20 minutes under a nitrogen atmosphere.

The portion of the copper plate having the sample liquid added thereonto before and after the irradiation of ultraviolet rays (UV light) was evaluated by feeling and then evaluated for a curing level using the following criteria.

Further, the copper plate after exposure was analyzed again by FT-IR, and since any of the copper plate having the sample liquid added thereonto had a decrease in the peaks in the region of 800 $cm^{-1}$ to 900 $cm^{-1}$, derived from a (meth)acryl group, a vinyl group, and an allyl group, it was confirmed that radical polymerization had proceeded.

This evaluation at an initial time concerned evaluation within 30 minutes after preparing a sample liquid for evaluation.

In addition, each of the sample liquids for evaluation prepared above was stored at an external temperature of 60° C. for 2 weeks to obtain each of stored samples. Each of the stored samples was applied onto a copper plate by the method as described above, and then irradiated with ultraviolet rays to carry out the evaluations as described above.

[Evaluation Criteria]

A: There was no viscosity even when being in contact with the sample plate after exposure, and there was no occurrence of scratches even when rubbed by the finger cushion.

B: There was slight viscosity and scratches occurred.

C: There was significant viscosity and many scratches occurred.

[Evaluation of Storage Stability]

The sample liquid for evaluation was stored at 60° C. for one week or two weeks, evaluations (time progress tests) of the obtained stored samples were carried out, and thus, the stability of the polymerizable compound was confirmed as follows.

Sample liquids for evaluation were prepared by the method in the evaluation of curability above, and stored at an external temperature of 60° C. for one week and for two weeks to obtain stored samples. Thereafter, the sample liquids for evaluation after storage (stored samples) were analyzed by high performance liquid chromatography (HPLC). By an absolute calibration method, the amounts of the polyfunctional polymerizable compound (A1) represented by the general formula (1), a comparative polyfunctional polymerizable compound, and the polyfunctional polymerizable compound (A2) which differs from A1 were quantified, respectively, to calculate the decomposition amount of the polyfunctional polymerizable compound (A) as a whole.

The decomposition amounts after one week and after two weeks were classified on the basis of the following criteria.

[Evaluation Criteria]

A: The decomposition amount of all the polyfunctional polymerizable compounds was a detection threshold or less (less than 10 ppm)

B: The decomposition amount of all the polyfunctional polymerizable compounds was 10 ppm or more and less than 500 ppm.

C: The decomposition amount of all the polyfunctional polymerizable compounds was 500 ppm or more.

The obtained results are summarized and shown in Table 1 below.

TABLE 1

(Solvent Composition 1)

| Cured composition No. | Polyfunctional polymerizable compound (component A) | | Ratio of A1 to A2 | | Curability | | Storage stability | | Notes |
|---|---|---|---|---|---|---|---|---|---|
| | Compound of general formula (1) (component A1) | Polyfunctional compound (component A2) | A1 | A2 | Initial time | Over time | After one week | After 2 weeks | |
| 101 | Polymerizable compound 1 | Polyfunctional compound 1 | 10 | 90 | A | B | A | A | The present invention |
| 102 | Polymerizable compound 1 | Polyfunctional compound 1 | 30 | 70 | A | B | A | A | The present invention |
| 103 | Polymerizable compound 1 | Polyfunctional compound 1 | 50 | 50 | A | A | A | A | The present invention |
| 104 | Polymerizable compound 1 | Polyfunctional compound 1 | 70 | 30 | A | A | A | A | The present invention |
| 105 | Polymerizable compound 1 | Polyfunctional compound 1 | 90 | 10 | A | A | A | A | The present invention |
| 106 | Polymerizable compound 1 | — | 100 | 0 | A | A | A | A | Reference Example |
| 107 | Polymerizable compound 1 | Polyfunctional compound 2 | 10 | 90 | A | A | A | A | The present invention |
| 108 | Polymerizable compound 1 | Polyfunctional compound 2 | 30 | 70 | A | A | A | A | The present invention |
| 109 | Polymerizable compound 1 | Polyfunctional compound 2 | 50 | 50 | A | A | A | A | The present invention |
| 110 | Polymerizable compound 1 | Polyfunctional compound 2 | 70 | 30 | A | A | A | A | The present invention |
| 111 | Polymerizable compound 1 | Polyfunctional compound 2 | 90 | 10 | A | A | A | A | The present invention |
| 112 | Polymerizable compound 1 | Polyfunctional compound 5 | 70 | 30 | A | A | A | A | The present invention |
| 113 | Polymerizable compound 1 | Polyfunctional compound 5 | 90 | 10 | A | A | A | A | The present invention |
| 114 | Polymerizable compound 1 | Polyfunctional compound 4 | 70 | 30 | A | A | A | A | The present invention |
| 115 | Polymerizable compound 1 | Polyfunctional compound 4 | 90 | 10 | A | A | A | A | The present invention |
| 116 | Polymerizable compound 7 | — | 100 | 0 | A | A | A | A | Reference Example |
| 117 | Polymerizable compound 7 | Polyfunctional compound 1 | 70 | 30 | A | A | A | A | The present invention |
| 118 | Polymerizable compound 7 | Polyfunctional compound 2 | 70 | 30 | A | A | A | A | The present invention |
| 119 | Polymerizable compound 7 | Polyfunctional compound 5 | 70 | 30 | A | A | A | A | The present invention |
| 120 | Polymerizable compound 7 | Polyfunctional compound 4 | 70 | 30 | A | A | A | A | The present invention |
| 121 | Polymerizable compound 3 | — | 100 | 0 | A | A | A | A | Reference Example |
| 122 | Polymerizable compound 3 | Polyfunctional compound 1 | 70 | 30 | A | A | A | A | The present invention |
| 123 | Polymerizable compound 3 | Polyfunctional compound 2 | 70 | 30 | A | A | A | A | The present invention |
| 124 | Polymerizable compound 3 | Polyfunctional compound 5 | 70 | 30 | A | A | A | A | The present invention |
| 125 | Polymerizable compound 3 | Polyfunctional compound 4 | 70 | 30 | A | A | A | A | The present invention |
| 126 | Polymerizable compound 1 | Polyfunctional compound 3 | 70 | 30 | A | A | A | B | The present invention |
| 127 | Polymerizable compound 1 | Polymerizable compound a | 70 | 30 | A | A | A | B | The present invention |
| 128 | Polymerizable compound 1 | Polyfunctional compound 6 | 10 | 90 | A | A | A | A | The present invention |
| 129 | Polymerizable compound 1 | Polyfunctional compound 6 | 30 | 70 | A | A | A | A | The present invention |
| 130 | Polymerizable compound 1 | Polyfunctional compound 6 | 50 | 50 | A | A | A | A | The present invention |
| 131 | Polymerizable compound 1 | Polyfunctional compound 6 | 70 | 30 | A | A | A | A | The present invention |
| 132 | Polymerizable compound 1 | Polyfunctional compound 6 | 90 | 10 | A | A | A | A | The present invention |
| 133 | Polymerizable compound 3 | Polyfunctional compound 6 | 70 | 30 | A | A | A | A | The present invention |
| 134 | Polymerizable compound 7 | Polyfunctional compound 6 | 70 | 30 | A | A | A | A | The present invention |
| 135 | Polymerizable compound 1 | Polyfunctional compound 7 | 10 | 90 | A | A | A | A | The present invention |
| 136 | Polymerizable compound 1 | Polyfunctional compound 7 | 30 | 70 | A | A | A | A | The present invention |
| 137 | Polymerizable compound 1 | Polyfunctional compound 7 | 50 | 50 | A | A | A | A | The present invention |
| 138 | Polymerizable compound 1 | Polyfunctional compound 7 | 70 | 30 | A | A | A | A | The present invention |
| 139 | Polymerizable compound 1 | Polyfunctional compound 7 | 90 | 10 | A | A | A | A | The present invention |
| 140 | Polymerizable compound 3 | Polyfunctional compound 7 | 70 | 30 | A | A | A | A | The present invention |
| 141 | Polymerizable compound 7 | Polyfunctional compound 7 | 70 | 30 | A | A | A | A | The present invention |
| 142 | Polymerizable compound 1 | Polyfunctional compound 8 | 10 | 90 | A | A | A | A | The present invention |
| 143 | Polymerizable compound 1 | Polyfunctional compound 8 | 30 | 70 | A | A | A | A | The present invention |
| 144 | Polymerizable compound 1 | Polyfunctional compound 8 | 50 | 50 | A | A | A | A | The present invention |
| 145 | Polymerizable compound 1 | Polyfunctional compound 8 | 70 | 30 | A | A | A | A | The present invention |
| 146 | Polymerizable compound 1 | Polyfunctional compound 8 | 90 | 10 | A | A | A | A | The present invention |
| 147 | Polymerizable compound 3 | Polyfunctional compound 8 | 70 | 30 | A | A | A | A | The present invention |
| 148 | Polymerizable compound 7 | Polyfunctional compound 8 | 70 | 30 | A | A | A | A | The present invention |
| 149 | Polymerizable compound 1 | Polyfunctional compound 9 | 10 | 90 | A | A | A | A | The present invention |
| 150 | Polymerizable compound 1 | Polyfunctional compound 9 | 30 | 70 | A | A | A | A | The present invention |
| 151 | Polymerizable compound 1 | Polyfunctional compound 9 | 50 | 50 | A | A | A | A | The present invention |
| 152 | Polymerizable compound 1 | Polyfunctional compound 9 | 70 | 30 | A | A | A | A | The present invention |
| 153 | Polymerizable compound 1 | Polyfunctional compound 9 | 90 | 10 | A | A | A | A | The present invention |
| 154 | Polymerizable compound 3 | Polyfunctional compound 9 | 70 | 30 | A | A | A | A | The present invention |

TABLE 1-continued

| No. | Polymerizable compound | Polyfunctional compound | A1 | A2 | Initial time | Over time | After one week | After 2 weeks | Notes |
|---|---|---|---|---|---|---|---|---|---|
| 155 | Polymerizable compound 7 | Polyfunctional compound 9 | 70 | 30 | A | A | A | A | The present invention |
| 156 | Polymerizable compound 1 | Polyfunctional compound 10 | 10 | 90 | A | A | A | A | The present invention |
| 157 | Polymerizable compound 1 | Polyfunctional compound 10 | 30 | 70 | A | A | A | A | The present invention |
| 158 | Polymerizable compound 1 | Polyfunctional compound 10 | 50 | 50 | A | A | A | A | The present invention |
| 159 | Polymerizable compound 1 | Polyfunctional compound 10 | 70 | 30 | A | A | A | A | The present invention |
| 160 | Polymerizable compound 1 | Polyfunctional compound 10 | 90 | 10 | A | A | A | A | The present invention |
| 161 | Polymerizable compound 3 | Polyfunctional compound 10 | 70 | 30 | A | A | A | A | The present invention |
| 162 | Polymerizable compound 7 | Polyfunctional compound 10 | 70 | 30 | A | A | A | A | The present invention |
| 163 | Polymerizable compound 1 | Polyfunctional compound 11 | 10 | 90 | A | A | A | A | The present invention |

| Cured composition No. | Comparative polymerizable compound | Polyfunctional compound (component A2) | A1 | A2 | Initial time | Over time | After one week | After 2 weeks | Comparison |
|---|---|---|---|---|---|---|---|---|---|
| c11 | Polymerizable compound a | Polyfunctional compound 1 | 70 | 30 | A | A | B | C | Comparative Example |
| c12 | Polymerizable compound a | Polyfunctional compound 2 | 70 | 30 | A | A | B | C | Comparative Example |
| c13 | Polymerizable compound a | Polyfunctional compound 5 | 70 | 30 | A | A | B | C | Comparative Example |
| c14 | Polymerizable compound a | Polyfunctional compound 4 | 70 | 30 | A | A | B | C | Comparative Example |
| c15 | Polymerizable compound b | Polyfunctional compound 1 | 70 | 30 | A | A | B | C | Comparative Example |
| c16 | Polymerizable compound b | Polyfunctional compound 2 | 70 | 30 | A | A | B | C | Comparative Example |
| c17 | Polymerizable compound b | Polyfunctional compound 5 | 70 | 30 | A | A | B | C | Comparative Example |
| c18 | Polymerizable compound b | Polyfunctional compound 4 | 70 | 30 | A | A | B | C | Comparative Example |
| c19 | — | Polyfunctional compound 1 | 0 | 100 | B | C | A | A | Comparative Example |
| c20 | — | Polyfunctional compound 2 | 0 | 100 | B | B | A | A | Comparative Example |
| c21 | — | Polyfunctional compound 5 | 0 | 100 | C | C | A | A | Comparative Example |
| c22 | — | Polyfunctional compound 4 | 0 | 100 | C | C | A | A | Comparative Example |
| c23 | — | Polyfunctional compound 3 | 0 | 100 | B | B | C | C | Comparative Example |
| c24 | — | Polyfunctional compound a | 0 | 100 | A | A | C | C | Comparative Example |

(Solvent Composition 2)

| Cured composition No. | Compound of general formula (1) (component A1) | Polyfunctional compound (component A2) | A1 | A2 | Initial time | Over time | After one week | After 2 weeks | Notes |
|---|---|---|---|---|---|---|---|---|---|
| 164 | Polymerizable compound 1 | Polyfunctional compound 6 | 10 | 90 | A | A | A | A | The present invention |
| 165 | Polymerizable compound 1 | Polyfunctional compound 6 | 30 | 70 | A | A | A | A | The present invention |
| 166 | Polymerizable compound 1 | Polyfunctional compound 6 | 50 | 50 | A | A | A | A | The present invention |
| 167 | Polymerizable compound 1 | Polyfunctional compound 6 | 70 | 30 | A | A | A | A | The present invention |
| 168 | Polymerizable compound 1 | Polyfunctional compound 6 | 90 | 10 | A | A | A | A | The present invention |
| 169 | Polymerizable compound 3 | Polyfunctional compound 6 | 70 | 30 | A | A | A | A | The present invention |
| 170 | Polymerizable compound 7 | Polyfunctional compound 6 | 70 | 30 | A | A | A | A | The present invention |
| 171 | Polymerizable compound 1 | Polyfunctional compound 7 | 10 | 90 | A | A | A | A | The present invention |
| 172 | Polymerizable compound 1 | Polyfunctional compound 7 | 30 | 70 | A | A | A | A | The present invention |
| 173 | Polymerizable compound 1 | Polyfunctional compound 7 | 50 | 50 | A | A | A | A | The present invention |
| 174 | Polymerizable compound 1 | Polyfunctional compound 7 | 70 | 30 | A | A | A | A | The present invention |
| 175 | Polymerizable compound 1 | Polyfunctional compound 7 | 90 | 10 | A | A | A | A | The present invention |
| 176 | Polymerizable compound 3 | Polyfunctional compound 7 | 70 | 30 | A | A | A | A | The present invention |
| 177 | Polymerizable compound 7 | Polyfunctional compound 7 | 70 | 30 | A | A | A | A | The present invention |
| 178 | Polymerizable compound 1 | Polyfunctional compound 8 | 10 | 90 | A | A | A | A | The present invention |
| 179 | Polymerizable compound 1 | Polyfunctional compound 8 | 30 | 70 | A | A | A | A | The present invention |
| 180 | Polymerizable compound 1 | Polyfunctional compound 8 | 50 | 50 | A | A | A | A | The present invention |
| 181 | Polymerizable compound 1 | Polyfunctional compound 8 | 70 | 30 | A | A | A | A | The present invention |
| 182 | Polymerizable compound 1 | Polyfunctional compound 8 | 90 | 10 | A | A | A | A | The present invention |
| 183 | Polymerizable compound 3 | Polyfunctional compound 8 | 70 | 30 | A | A | A | A | The present invention |
| 184 | Polymerizable compound 7 | Polyfunctional compound 8 | 70 | 30 | A | A | A | A | The present invention |
| 185 | Polymerizable compound 1 | Polyfunctional compound 9 | 10 | 90 | A | A | A | A | The present invention |
| 186 | Polymerizable compound 1 | Polyfunctional compound 9 | 30 | 70 | A | A | A | A | The present invention |
| 187 | Polymerizable compound 1 | Polyfunctional compound 9 | 50 | 50 | A | A | A | A | The present invention |
| 188 | Polymerizable compound 1 | Polyfunctional compound 9 | 70 | 30 | A | A | A | A | The present invention |
| 189 | Polymerizable compound 1 | Polyfunctional compound 9 | 90 | 10 | A | A | A | A | The present invention |
| 190 | Polymerizable compound 3 | Polyfunctional compound 9 | 70 | 30 | A | A | A | A | The present invention |
| 191 | Polymerizable compound 7 | Polyfunctional compound 9 | 70 | 30 | A | A | A | A | The present invention |
| 192 | Polymerizable compound 1 | Polyfunctional compound 10 | 10 | 90 | A | A | A | A | The present invention |
| 193 | Polymerizable compound 1 | Polyfunctional compound 10 | 30 | 70 | A | A | A | A | The present invention |
| 194 | Polymerizable compound 1 | Polyfunctional compound 10 | 50 | 50 | A | A | A | A | The present invention |
| 195 | Polymerizable compound 1 | Polyfunctional compound 10 | 70 | 30 | A | A | A | A | The present invention |
| 196 | Polymerizable compound 1 | Polyfunctional compound 10 | 90 | 10 | A | A | A | A | The present invention |
| 197 | Polymerizable compound 3 | Polyfunctional compound 10 | 70 | 30 | A | A | A | A | The present invention |
| 198 | Polymerizable compound 7 | Polyfunctional compound 10 | 70 | 30 | A | A | A | A | The present invention |

As clearly seen from the results of Table 1, it can be seen that in the case of using the compound represented by the general formula (1) (curable compositions 101 to 198), the curability and the storage stability are both excellent. The reason why the storage stability is slightly deteriorated in the curable compositions 126 and 127 is presumed to be due to the decomposition of the polyfunctional compounds.

Example 2

By using the polyfunctional polymerizable compound used in Example 1, an image was formed by an ink jet method as follows and evaluation as an ink composition was carried out.

(Synthesis of Polymeric Dispersant P-1)

88 g of methyl ethyl ketone was put into a three-necked flask with a volume of 1000 ml, equipped with a stirrer and a condenser, followed by heating to 72° C. under a nitrogen atmosphere. A solution in which 0.85 g of dimethyl 2,2'-azobisisobutyrate, 60 g of benzyl methacrylate, 10 g of methacrylic acid, and 30 g of methyl methacrylate were dissolved in 50 g of methyl ethyl ketone was added dropwise thereto over 3 hours. After completion of the dropwise addition, the reaction was carried out for additional 1 hour, and a solution in which 0.42 g of dimethyl 2,2'-azobisisobutyrate was dissolved in 2 g of methyl ethyl ketone was added thereto, followed by warming to 78° C. and heating for 4 hours. The obtained reaction solution was reprecipitated in a large excess of hexane twice and the deposited resin was dried to obtain 96 g of a polymeric dispersant P-1.

The composition of the obtained resin was confirmed by $^1$H-NMR and the weight average molecular weight (Mw) determined by GPC was 44,600. Further, the acid value was determined by the method described in JIS standard (JISK0070: 1992) and was found to be 65.2 mgKOH/g.

(Preparation of Resin-Coated Pigment Dispersion)
—Resin-Coated Cyan Pigment Dispersion—

10 parts of Pigment Blue 15:3 (Phthalocyanine Blue A220, manufactured by Dainichiseika Color & Chemicals Mfg., Co., Ltd.), 5 parts of the polymeric dispersant P-1, 42 parts of methyl ethyl ketone, 5.5 parts of a 1 mol/L NaOH aqueous solution, and 87.2 parts of ion-exchanged water were mixed and dispersed for 2 hours to 6 hours using 0.1 mmϕ zirconia beads by a bead mill.

Methyl ethyl ketone was removed from the obtained dispersion at 55° C. under reduced pressure and a part of water was further removed from the residue to obtain a resin-coated cyan pigment dispersion (the colored particles) having a pigment concentration of 10.2% by mass.

—Resin-Coated Magenta Pigment Dispersion—

A resin-coated magenta pigment dispersion (colored particles) was obtained in the same manner as the preparation of the resin-coated cyan pigment dispersion except for using Chromophthal Jet Magenta DMQ (Pigment Red 122, manufactured by BASF Japan Ltd.) instead of Phthalocyanine Blue A220 which was used as a pigment in the preparation of the resin-coated cyan pigment dispersion.

—Resin-Coated Yellow Pigment Dispersion—

A resin-coated yellow pigment dispersion (colored particles) was obtained in the same manner as the preparation of the resin-coated cyan pigment dispersion except for using Irgalite Yellow GS (Pigment Yellow 74, manufactured by BASF Japan Ltd.) instead of Phthalocyanine Blue A220 which was used as a pigment in the preparation of the resin-coated cyan pigment dispersion.

(Preparation of Clear Ink C1-1)

The polymerizable compound 1 and the polyfunctional compound 2 synthesized as above, a polymerization initiator, a surfactant, and ion-exchanged water were mixed in the following formulation, and then filtered through a 5 μm membrane filter to prepare a clear ink C1-1.
—Ink Formulation—

| (Component A) | |
|---|---|
| (A1) Polymerizable compound 1 | 18% by mass |
| (A2) polyfunctional compound 2 | 2% by mass |
| (Component B) | |
| Irgacure 2959 | 3% by mass |
| (manufactured by BASF Japan) | |
| OLFINE E1010 (manufactured | 1% by mass |
| by Nissin Chemical Industry | |
| Co., Ltd.) | |
| (Component E) | |
| Ion-exchanged water | Added so that the total amount is 100% |

The pH (25° C.) of the clear ink C1-1 was measured using a pH meter WM-50EG (manufactured by DKK-TOA Corporation), and the pH value was found to be 7.0.

(Preparation of Clear Inks C1-2 to C1-4)

Clear inks C1-2 to C1-4 were prepared in the same manner as for the preparation of the clear ink C1-1 except that the polymerizable compound 1 (A1) in the preparation of the clear ink C1-1 was changed to the same amounts (% by mass) of the polymerizable compound 2, the polymerizable compound 3, and the polymerizable compound 7, respectively. The pH values were all 7.0.

(Preparation of Cyan Ink C-1)

The polymerizable compound 1 and the polyfunctional compound 2 synthesized as above, a polymerization initiator, the resin-coated cyan pigment dispersion prepared above, a surfactant, and ion-exchanged water were mixed in the following formulation and filtered through a 5 μm membrane filter to obtain a cyan ink C-1.
—Ink Formulation—

| (Component A) | |
|---|---|
| (A1) Polymerizable compound 1 | 18% by mass |
| (A2) polyfunctional compound 2 | 2% by mass |
| (Component B) | |
| Irgacure 2959 | 3% by mass |
| (manufactured by BASF Japan) | |
| (Component D) | |
| Resin-coated | 6% by mass |
| cyan pigment dispersion | |
| OLFINE E1010 (manufactured | 1% by mass |
| by Nissin Chemical Industry | |
| Co., Ltd.) | |
| (Component E) | |
| Ion-exchanged water | Added so that the total amount is 100% |

The pH (25° C.) of the cyan ink C-1 was measured using a pH meter WM-50EG (manufactured by DKK-TOA Corporation), and the pH value was found to be 8.5.

(Preparation of Yellow Ink Y-1)

A yellow ink Y-1 was prepared in the same manner as for the preparation of the cyan ink C-1 except that a resin-coated yellow pigment dispersion was used instead of the resin-coated cyan pigment dispersion in the preparation of the cyan ink C-1. The pH value was 8.5.

(Preparation of Magenta Ink M-1)

A magenta ink M-1 was prepared in the same manner as for the preparation of the cyan ink C-1 except that a resin-coated magenta pigment dispersion was used instead of the resin-coated cyan pigment dispersion in the preparation of the cyan ink C-1. The pH value was 8.5.

(Preparation of Magenta Inks M-2 to M-11)

Magenta inks M-2 to M-11 were prepared in the same manner as for the preparation of the magenta ink M-1 except that the monofunctional polymerizable compound (exemplary monofunctional polymerizable compound) which is the component (C), described in Table 2, was further added and the content of the component (A) in the preparation of the magenta ink M-1 was changed to that as shown in Table 2.

Further, the mixing ratio of the polymerizable compound 1 (A1) to the polyfunctional compound 2 (A2) in the component A was set to be the same as in the magenta ink M-1. The pH values were all 8.5.

(Preparation of Black Ink K-1)

A black ink K-1 was prepared in the same manner as for the preparation of the cyan ink C-1 except that a pigment dispersion carbon black (MA-100 manufactured by Mitsubishi Chemical Corporation) was used instead of the resin-coated cyan pigment dispersion in the preparation of the cyan ink C-1. The pH value was 8.5.

(Preparation of Comparative Magenta Inks RM-1 to RM-4)

Comparative magenta inks (RM-1) to (RM-4) were prepared in the same manner as for the preparation of the magenta ink M-1 except that the polymerizable compound 1 (A1) as the component (A) was changed to the polymerizable compound a or b as described in Table 2, and the content of the component (A), and the kind and content of the component (C) in the preparation of the magenta ink M-1 were changed as shown in Table 2.

Further, the mixing ratio of the polymerizable compound 1 (A1) to the polyfunctional compound 2 (A2) in the component A was set to be the same as in the magenta ink M-1.

(Production of Treatment Liquid)

The components shown in "Composition of Treatment Liquid 1" as described below were mixed to prepare a treatment liquid 1. The pH (25° C.) of the treatment liquid 1 was measured using a pH meter (WM-50EG manufactured by DKK-TOA Corporation) and the pH value was found to be 1.02.

"Composition of Treatment Liquid 1"

| | |
|---|---|
| Malonic acid (manufactured by Wako Pure Chemical Industries, Ltd.) | 25% |
| Diethylene glycol monomethyl ether (manufactured by Wako Pure Chemical Industries, Ltd.) | 20% |
| EMULGEN P109 (nonionic surfactant, manufactured by Kao Corporation) | 1% |
| Ion-exchanged water | Residual amount so that the total amount is 100% |

(Image Formation)

Figure 2:
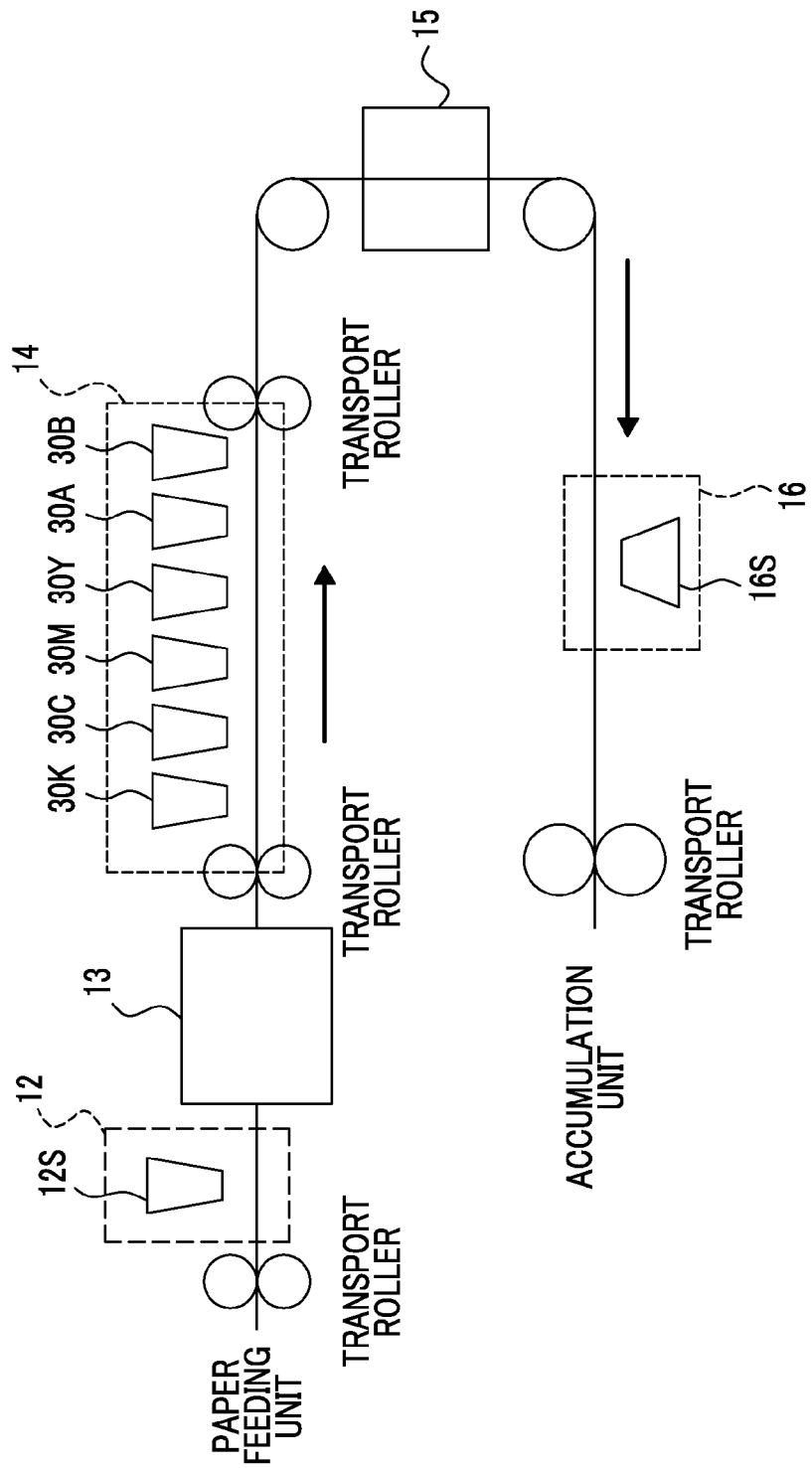
FIG. 2 is a schematic view showing an image forming step of Examples.

As shown in FIG. 2, an ink jet device in which a treatment liquid adding unit 12 provided with a treatment liquid ejecting head 12S, a treatment liquid drying zone 13, an ink ejection unit 14, an ink drying zone 15, and an ultraviolet ray irradiation unit 16 provided with an ultraviolet ray irradiation lamp 16S were sequentially arranged in the transport direction (in the direction of the arrow in the Figure) of the recording medium was prepared.

The treatment liquid drying zone 13 was provided with an air blower performing drying by blowing drying air on the recording surface side of the recording medium, equipped with an infrared ray heater on the non-recording surface side of the recording medium, and was configured to evaporate (dry) 70% by mass or more of the water in the treatment liquid by the temperature and the air amount being adjusted until 900 msec had passed since the start of the adding of the treatment liquid by the treatment liquid adding unit 12 (not shown).

In the ink ejection unit 14, a black ink ejection head 30K, a cyan ink ejection head 30C, a magenta ink ejection head 30M, and a yellow ink ejection head 30Y were arranged in order in the transport direction (the direction of the arrow), each head was a full line head having a 1200 dpi/10 inch width (drive frequency: 25 kHz, transport speed of the recording medium of 530 mm/sec) and the ink ejection unit 14 was configured to eject each color in the main scanning direction with a single pass and to perform recording.

The treatment liquid 1 was filled into a storage tank (not shown) linked to the treatment liquid ejecting head 12S of the ink jet recording device. In addition, the ink compositions of corresponding colors were filled into any of the storage tanks (not shown) respectively linked to the ink ejection heads 30K, 30C, 30M, and 30Y. "OK Top Coat+" (Basis weight of 104.7 g/m$^2$) manufactured by Oji Paper Co., Ltd. was used as a recording medium.

During recording of the image, the treatment liquid and the ink compositions were ejected with a resolution of 1200 dpi×600 dpi with ink droplets of 3.5 pl and a line image or a solid image was recorded. At this time, the line image was recorded by ejecting a 1 dot width line, a 2 dot width line, and a 4 dot width line of 1200 dpi in the main scanning direction with a single pass. As to the solid image, an image with a size of 104 mm×140 mm, with respect to the recording medium which was cut to A5 size was recorded by ejecting the treatment liquid and the ink composition. The addition amount of the treatment liquid to the recording medium was set to be 5 ml/m$^2$.

First, in the recording of an image, after the treatment liquid was ejected from the treatment liquid ejecting head 12S onto the recording medium with a single pass, drying of the treatment liquid was carried out in the treatment liquid drying zone 13, and the recording medium was set to pass through the treatment liquid drying zone 13 before 900 msec had passed from the start of ejection of the treatment liquid. In the treatment liquid drying zone 13, while heating the treatment liquid which was landed with an infrared ray heater from the reverse side (rear side) to the landing surface so that the temperature of the film surface became 40° C. to 45° C., warm air of 120° C. was sent to the recording surface by an air blower, and the air amount was changed so as to adjust to a predetermined drying amount. Subsequently, after the ink compositions was ejected with a single pass by any of the ink ejection heads 30K, 30C, 30M, and 30Y to record an image, in the ink drying zone 15, while heating with an infrared ray heater from the reverse side (rear side) to the ink landing surface, warm air at 120° C. and 5 m/sec was sent by an air blower to the recording surface for 15 seconds for drying in the same manner as described above. After drying the image, in the ultraviolet ray irradiation unit 16, UV light (metal halide lamp manufactured by Eye Graphics Co., Ltd., maximum irradiation wavelength 365 nm) was irradiated so that the total irradiation amount became 600 mJ/cm² to cure the image, thereby obtaining a sample for evaluation.

The following items were evaluated.

[Evaluation of Curability]

Tokubishi Art double-side N (manufactured by Mitsubishi Paper Mills Ltd.) which was not printed was wound around a paperweight (with a mass of 470 g and a size of 15 mm×30 mm×120 mm), and the print surface of the sample for evaluation was rubbed back and forth three times (equivalent to a load 260 kg/m²). The area in which Tokubishi Art double side-N which was not printed came into contact with a sample for evaluation was 150 mm² After rubbing, the print surface was visually observed and evaluated according to the following evaluation criteria.

—Evaluation Criteria—
A: There was no peeling of an image (coloring material) on the print surface.
B: An image (coloring material) on the print surface peeled slightly.
C: An image (coloring material) on the print surface peeled at a practically problematic level.

[Evaluation of Ejection Recovery Property]

An image was formed in the same manner as in the image forming method which was carried out for the evaluation of the curability described above. After an ink was ejected, an ink ejection head was left as it was for 5 minutes up to 45 minutes and after every 5 minutes, a new recording medium was fixed on a stage and a line was printed by droplet shooting under the same conditions again. The exposure time in which all of the 96 nozzles were capable of ejecting with 2,000 of droplet shooting was examined and the ejection recovery property was evaluated according to the following evaluation criteria. The longer the exposure time is, the more favorable ejection recovery properties are.

—Evaluation Criteria—
AA: After being left as it was for 45 minutes, all nozzles were capable of ejecting.
A: When being left as it was for 30 minutes or longer and shorter than 45 minutes, there were some nozzles which were not capable of ejecting.
B: When being left as it was for 20 minutes or longer and shorter than 30 minutes, there were some nozzles which were not capable of ejecting.
C: When being left as it was for shorter than 20 minutes, there were some nozzles which were not capable of ejecting.

[Evaluation of Flexibility]

A GELJET GX5000 printer head manufactured by Ricoh Co., Ltd. was prepared, the direction of a line head (the main scanning direction) on which 96 nozzles were lined up was matched with the direction perpendicular to the direction of movement of the stage (the sub-scanning direction), and the printer head was fixed to an ink jet device. The ink composition prepared above was filled into the storage tank which was linked to the printer head.

A vinyl chloride film (P280RW, manufactured by Lintec Corporation) was prepared as a recording medium and fixed on the stage which moved in the direction (the sub-scanning direction) perpendicular to the array direction of nozzles of the head (the main scanning direction).

During making the stage move at 211 mm/sec in the transport direction (the sub-scanning direction), 96 lines were printed in parallel with respect to the transport direction by 2000 of droplet shooting per one nozzle with the amount of ink droplets of 3.4 pL, the ejection frequency of 10 kHz and the array direction×the transport direction in nozzles=75 dpi× 1200 dpi. At this time, it was confirmed that all nozzles ejected.

After printing, by exposing so as to be 600 mJ/cm² using a Deep UV lamp (SP-7, manufactured by USHIO Inc.), the sample for evaluation in which the solid image was formed was prepared.

The sample for evaluation was folded once so that the print surfaces of the sample for evaluation on which the obtained solid image as above was formed were superimposed on each other, and was folded once more in the direction in which the back surfaces were superimposed on each other. The print surface was visually observed and evaluated using the following evaluation standards.

—Evaluation Criteria—
A: There was neither cracks nor peeling.
B: Cracks slightly occurred, but there was no peeling.
C: Cracks and peeling occurred.

The obtained results are shown in Table 2 below.

TABLE 2

| Experiment No. | Ink composition | Component A Kind of (A1) polymerizable compound | Content (mass by %) of component A | Component C Monofunctional polymerizable compound | Content (mass by %) | Component A:component C | Storage stability | Curability | Ejection recovery property | Flexibility | Notes |
|---|---|---|---|---|---|---|---|---|---|---|---|
| Experiment 1 | Cl-1 | Polymerizable compound 1 | 20 | None | 0 | 20:0 | A | A | A | B | The present invention |
| Experiment 2 | Cl-2 | Polymerizable compound 2 | 20 | None | 0 | 20:0 | A | A | A | B | The present invention |
| Experiment 3 | Cl-3 | Polymerizable compound 3 | 20 | None | 0 | 20:0 | A | A | A | B | The present invention |
| Experiment 4 | Cl-4 | Polymerizable compound 7 | 20 | None | 0 | 20:0 | A | A | A | B | The present invention |
| Experiment 5 | C-1 | Polymerizable compound 1 | 20 | None | 0 | 20:0 | A | A | A | B | The present invention |
| Experiment 6 | Y-1 | Polymerizable compound 1 | 20 | None | 0 | 20:0 | A | A | A | B | The present invention |
| Experiment 7 | M-1 | Polymerizable compound 1 | 20 | None | 0 | 20:0 | A | A | A | B | The present invention |
| Experiment 8 | K-1 | Polymerizable compound 1 | 20 | None | 0 | 20:0 | A | A | A | B | The present invention |
| Experiment 9 | M-2 | Polymerizable compound 1 | 15 | C-2 | 5 | 15:5 | A | A | A | B | The present invention |
| Experiment 10 | M-3 | Polymerizable compound 1 | 15 | C-11 | 5 | 15:5 | A | A | A | B | The present invention |

TABLE 2-continued

| Experiment No. | Ink composition | Component A Kind of (A1) polymerizable compound | Content (mass by %) of component A | Component C Monofunctional polymerizable compound | Content (mass by %) | Component A:component C | Storage stability | Curability | Ejection recovery property | Flexibility | Notes |
|---|---|---|---|---|---|---|---|---|---|---|---|
| Experiment 11 | M-4 | Polymerizable compound 1 | 15 | C-1 | 5 | 15:5 | A | A | A | B | The present invention |
| Experiment 12 | M-5 | Polymerizable compound 1 | 15 | C-13 | 5 | 15:5 | A | A | A | B | The present invention |
| Experiment 13 | M-6 | Polymerizable compound 1 | 10 | C-2 | 10 | 10:10 | A | A | AA | A | The present invention |
| Experiment 14 | M-7 | Polymerizable compound 1 | 10 | C-11 | 10 | 10:10 | A | B | AA | A | The present invention |
| Experiment 15 | M-8 | Polymerizable compound 1 | 10 | C-1 | 10 | 10:10 | A | B | AA | A | The present invention |
| Experiment 16 | M-9 | Polymerizable compound 1 | 5 | C-2 | 15 | 5:15 | A | A | AA | A | The present invention |
| Experiment 17 | M-10 | Polymerizable compound 1 | 5 | C-11 | 15 | 5:15 | A | B | AA | A | The present invention |
| Experiment 18 | M-11 | Polymerizable compound 1 | 5 | C-1 | 15 | 5:15 | A | B | AA | A | The present invention |
| Experiment c1 | RM-1 | Polymerizable compound a | 20 | None | 0 | 20:0 | C | A | A | B | Comparative Example |
| Experiment c2 | RM-2 | Polymerizable compound b | 20 | None | 0 | 20:0 | A | C | A | B | Comparative Example |
| Experiment c3 | RM-3 | Polymerizable compound a | 15 | C-13 | 5 | 15:5 | C | A | A | B | Comparative Example |
| Experiment c4 | RM-4 | Polymerizable compound b | 15 | C-13 | 5 | 15:5 | A | C | A | A | Comparative Example |

As clearly seen from the results in Table 2, the ink compositions (C1-1 to C1-4, C-1, Y-1, K-1, and M-1 to M-11) using the curable compositions of the present invention included the polymerizable compounds 1 to 3, and 7 represented by the general formula (1) (polyfunctional polymerizable compounds A1) and the polyfunctional compound which differs from that of the general formula (1) (the polyfunctional polymerizable compound A2 which differs from A1) of the present invention, and exhibited good results in all the evaluation items of storage stability, curability, ejection recovery property, and flexibility. In particular, the ink compositions M-6 to M-11 including a certain amount of the monofunctional polymerizable compound (C) in addition to the polyfunctional polymerizable compound (A) had a further improvement in the ejection recovery property and the flexibility.

In this regard, with the ink compositions RM-1 to RM-4 not including the polymerizable compound represented by the general formula (1) of the present invention, desired storage stability or curability was not obtained.

What is claimed is:

1. A curable composition comprising a polyfunctional polymerizable compound A1 represented by the following general formula (1) and a polyfunctional polymerizable compound A2 which differs from A1;

[Chem. 1]

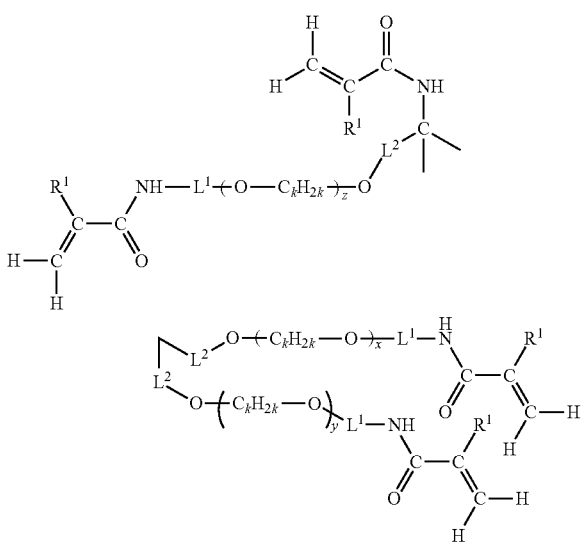

General Formula (1)

in the general formula (1),
$R^1$ represents a hydrogen atom or a methyl group,
$L^1$ represents a linear or branched alkylene group having 2 to 4 carbon atoms; however, $L^1$ does not have a structure in which the oxygen atom and the nitrogen atom bonded on both ends of $L^1$ are bonded to the same carbon atom of $L^1$, $L^2$ represents a divalent linking group, k represents 2 or 3, x, y, and z each independently represent integers of 0 to 6, and x+y+z equals 0 to 18.

2. The curable composition according to claim 1, wherein the polyfunctional polymerizable compound A2 is a monomer having at least two ethylenically unsaturated groups.

3. The curable composition according to claim 1, wherein the polyfunctional polymerizable compound A2 is a monomer having at least two groups selected from a (meth)acryloyl group and a vinyl group.

4. The curable composition according to claim 1, wherein the polyfunctional polymerizable compound A2 is a compound represented by the following general formula (M1), (M2), or (M3);

[Chem. 2]

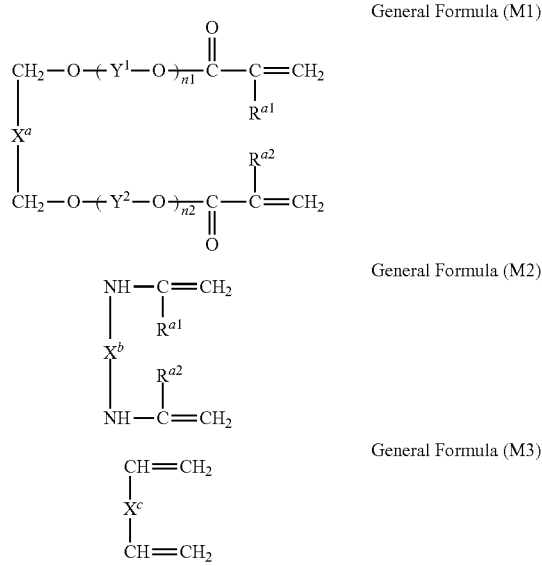

in the general formulae (M1) to (M3), $R^{a1}$ and $R^{a2}$ each independently represent a hydrogen atom or a methyl group, $Y^1$ and $Y^2$ each independently represent an alkylene group, n1 and n2 each independently represent 0 or a number of 1 or more, and $X^a$, $X^b$, and $X^c$ each represent a divalent linking group.

5. The curable composition according to claim 4, wherein $X^a$ and $X^b$ are each an alkylene group or an alkylene group interrupted by an oxygen atom, $Y^1$ and $Y^2$ are each an ethylene group or a propylene group, and $X^c$ is an alkylene group or a phenylene group.

6. The curable composition according to claim 1, wherein the ratio of the content of the polyfunctional polymerizable compound A1 to the content of the polyfunctional polymerizable compound A2 in the curable composition satisfies a content of A1:a content of A2=99:1 to 5:95 on the basis of mass.

7. The curable composition according to claim 1, further comprising a monofunctional polymerizable compound C.

8. The curable composition according to claim 7, wherein the monofunctional polymerizable compound C is a monofunctional polymerizable compound having a (meth)acrylamide structure.

9. The curable composition according to claim 7, wherein the monofunctional polymerizable compound C is a compound represented by the following general formula (MA);

[Chem. 3]

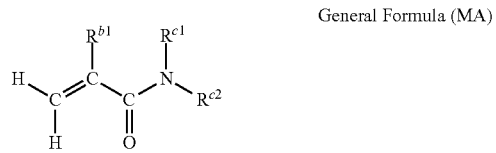

in the general formula (MA), $R^{b1}$ represents a hydrogen atom or a methyl group, $R^{c1}$ represents a hydrogen atom, a methyl group, or an ethyl group, and $R^{c2}$ represents an alkyl group, and $R^{c1}$ and $R^{c2}$ may be bonded to each other to form a 5- to 8-membered ring.

10. The curable composition according to claim 7, wherein the ratio of the content of all the polyfunctional polymerizable compounds A including the polyfunctional polymerizable compound A1 and the polyfunctional polymerizable compound A2 to the content of the monofunctional polymerizable compound C in the curable composition satisfies a content of A:a content of C=1:99 to 90:10 on the basis of mass.

11. The curable composition according to claim 1, wherein the content of all the polyfunctional polymerizable compounds A in the curable composition is from 0.1% by mass to 20% by mass.

12. The curable composition according to claim 7, wherein the content of the monofunctional polymerizable compound C in the curable composition is from 2% by mass to 35% by mass.

13. The curable composition according to claim 1, further comprising a solvent.

14. The curable composition according to claim 13, wherein water is contained in the solvent.

15. The curable composition according to claim 1, wherein the curable composition is a composition for an ink.

16. The curable composition according to claim 15, further comprising a coloring material.

17. The curable composition according to claim 15, which is used for ink jet recording.

18. An image forming method comprising:

adding the curable composition according to claim 1 on a recording medium; and irradiating the added curable composition with actinic energy rays.

19. The image forming method according to claim 18, wherein the curable composition is added onto the recording medium in an ink jet mode.

* * * * *